United States Patent
Hulusi et al.

(10) Patent No.: US 9,548,973 B2
(45) Date of Patent: Jan. 17, 2017

(54) DETECTING AND RESPONDING TO AN ATYPICAL BEHAVIOR

(71) Applicant: Assa Abloy AB, Stockholm (SE)

(72) Inventors: Tam Hulusi, Santa Ana, CA (US); Robert Wamsley, Golden, CO (US); Michael L. Davis, Amherst, NY (US)

(73) Assignee: ASSA ABLOY AB (SE)

( * ) Notice: Subject to any disclaimer, the term of this patent is extended or adjusted under 35 U.S.C. 154(b) by 477 days.

(21) Appl. No.: 14/034,404

(22) Filed: Sep. 23, 2013

(65) Prior Publication Data

US 2014/0053248 A1 Feb. 20, 2014

Related U.S. Application Data

(63) Continuation-in-part of application No. 12/166,221, filed on Jul. 8, 2008, now Pat. No. 8,543,684, which is a continuation-in-part of application No. 12/120,075, filed on May 13, 2008, now abandoned.

(60) Provisional application No. 60/968,009, filed on Aug. 24, 2007.

(51) Int. Cl.
  H04L 29/06 (2006.01)
  H04W 4/02 (2009.01)
  G06F 11/30 (2006.01)
  H04W 48/04 (2009.01)
  G07C 9/00 (2006.01)

(52) U.S. Cl.
  CPC ........... *H04L 63/08* (2013.01); *G07C 9/00103* (2013.01); *H04L 63/102* (2013.01); *G07C 9/00896* (2013.01); *G07C 2209/08* (2013.01)

(58) Field of Classification Search
  CPC ..... H04W 4/021; H04W 48/04; G06F 21/316; H04L 63/08

USPC ....... 340/5.2; 726/23, 22; 455/411; 713/200, 713/168
  See application file for complete search history.

(56) References Cited

U.S. PATENT DOCUMENTS

| | | | |
|---|---|---|---|
| 6,463,276 B1 * | 10/2002 | Jonsson | H04M 1/673 455/410 |
| 6,748,195 B1 * | 6/2004 | Phillips | H04M 1/72569 370/338 |
| 7,145,871 B2 | 12/2006 | Levy et al. | |
| 7,788,722 B1 | 8/2010 | Njemanze et al. | |
| 7,978,050 B2 | 7/2011 | Moshfeghi | |

(Continued)

FOREIGN PATENT DOCUMENTS

| | | |
|---|---|---|
| EP | 1026855 | 8/2000 |
| EP | 1351441 | 10/2003 |

(Continued)

OTHER PUBLICATIONS

Official Action for U.S. Appl. No. 14/034,238, mailed Aug. 21, 2015 17 pages.

(Continued)

*Primary Examiner* — Nam V Nguyen
(74) *Attorney, Agent, or Firm* — Sheridan Ross P.C.

(57) ABSTRACT

Methods, devices, and systems are provided for optimizing the dissemination of information in various types of systems such as an access control system. More specifically, there are provided herein various mechanisms to provide a modified agent path such that an agent following the modified agent path, may update at least one non-networked reader. The update of the at least one non-networked reader not occurring if the agent follows an unmodified agent path.

20 Claims, 18 Drawing Sheets

(56) References Cited

U.S. PATENT DOCUMENTS

| | | | |
|---|---|---|---|
| 7,983,211 | B2 | 7/2011 | Lovegren et al. |
| 8,074,271 | B2 | 12/2011 | Davis et al. |
| 8,543,684 | B2 | 9/2013 | Hulusi et al. |
| 8,961,619 | B2 * | 2/2015 | Gum ................ G06F 21/31 380/258 |
| 9,083,712 | B2 * | 7/2015 | Porras ................ H04L 63/101 |
| 9,100,778 | B2 * | 8/2015 | Stogaitis ................ H04W 4/02 |
| 9,118,706 | B2 * | 8/2015 | Bianco ................ H04L 63/1433 |
| 9,352,774 | B2 * | 5/2016 | Ueda ................ B62D 15/025 |
| 2003/0028814 | A1 | 2/2003 | Carta et al. |
| 2005/0044402 | A1 | 2/2005 | Libin et al. |
| 2006/0019632 | A1 * | 1/2006 | Cunningham ........ G06Q 30/00 455/408 |
| 2006/0165060 | A1 | 7/2006 | Dua et al. |
| 2008/0086758 | A1 | 4/2008 | Chowdhury et al. |
| 2009/0135817 | A1 | 5/2009 | Hulusi et al. |
| 2009/0225739 | A1 | 9/2009 | Yeo et al. |
| 2009/0251282 | A1 * | 10/2009 | Fitzgerald ................ G06F 21/88 340/5.31 |
| 2011/0285502 | A1 | 11/2011 | Steinmetz et al. |
| 2013/0310053 | A1 * | 11/2013 | Srivastava ............ H04W 4/021 455/446 |
| 2013/0324166 | A1 * | 12/2013 | Mian ................ H04W 4/021 455/457 |

FOREIGN PATENT DOCUMENTS

| | | |
|---|---|---|
| EP | 2031801 | 3/2009 |
| GB | 2446912 | 8/2008 |

OTHER PUBLICATIONS

U.S. Appl. No. 14/034,238, filed Sep. 23, 2013, Hulusi et al.

Beaufour et al., "Smart-tag based data dissemination," Proceeding of the 1st ACM International Workshop on Wireless Sensor Networks and Applications, Sep. 2002, pp. 68-77.

Callaway et al., "Are randomly grown graphs really random?," Physical Review E, vol. 64(4), 2001, 7 pages.

Carreras et al., "A Framework for Opportunistic Forwarding in Disconnected Networks," 2006 Third Annual International Conference on Mobile and Ubiquitous Systems: Networking & Services, Jul. 2006, pp. 1-8.

De Aguiar et al., "Spectral analysis and the dynamic response of complex networks," Physical Review E, vol. 71, 2005, 5 pages.

Erdos et al. "On Random Graphs I," 1959, pp. 290-297.

Farkas et al., "Networks in life: scaling properties and eigenvalue spectra," Physica A, vol. 314, 2002, pp. 25-34.

Glance et al., "Pollen: using people as a communication medium," Computer Networks, vol. 35(4), Mar. 2001, pp. 429-442.

Goh et al., "Spectra and eigenvectors of scale-free networks," Physical Review E, vol. 64, 2001, 5 pages.

Newman al., "Random graphs with arbitrary degree distribution and their applications," Physical Review E, vol. 64, 2001, 17 pages.

Ramasco et al., "Self-organization of collaboration networks," Physical Review E, vol. 70, 2004, 10 pages.

Sanchez et al., "Waiting-time statistics of self-organized-criticality systems," Physical Review Letters, vol. 88, No. 6, 2002, 4 pages.

"The Oracle of Bacon at Virginia, From Various Articles About the Oracle," Computer Science at the University of Virginia, available at http://www.cs.virginia.edu/misc/news-bacon.html, 1996, accessed on Oct. 21, 2010, 8 pages.

Watts et al., "Collective dynamics of 'small-world' networks," Nature, vol. 393, 1998, pp. 440-442.

Examination Report for Australian Patent Application No. 2008207399, dated Jun. 15, 2012 4 pages.

Partial European Search Report for European Patent Application No. 08162494.2, dated Nov. 16, 2009.

Extended European Search Report for European Patent Application No. 08162494.2, dated Feb. 1, 2010.

Official Action for European Patent Application No. 08162494.2, dated Jul. 13, 2010.

Official Action for European Patent Application No. 08162494, dated May 17, 2011 59 pages.

Official Action for U.S. Appl. No. 12/166,221, mailed Feb. 3, 2011 6 pages.

Official Action for U.S. Appl. No. 12/166,221, mailed Apr. 27, 2011 15 pages.

Official Action for U.S. Appl. No. 12/166,221, mailed Nov. 21, 2011 20 pages.

Official Action for U.S. Appl. No. 12/166,221, mailed May 4, 2012 22 pages.

Official Action for U.S. Appl. No. 12/166,221, mailed Nov. 26, 2012 24 pages.

Notice of Allowance for U.S. Appl. No. 12/166,221, mailed May 24, 2013 9 pages.

Official Action for U.S. Appl. No. 14/034,238, mailed Sep. 8, 2016 22 pages.

* cited by examiner

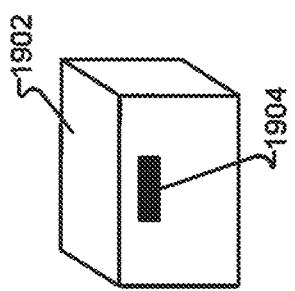

DETECTING AND RESPONDING TO AN ATYPICAL BEHAVIOR

CROSS REFERENCE TO RELATED APPLICATIONS

This application is a Continuation-in-Part and claims the benefit of U.S. Provisional Application No. 60/968,009, filed Aug. 24, 2007, abandoned U.S. patent application Ser. No. 12/120,075, filed May 13, 2008, and U.S. Pat. No. 8,543,684 filed Jul. 8, 2008 the entire disclosures of which are hereby incorporated herein by reference.

FIELD OF THE INVENTION

The present invention relates generally to access control systems, devices, and methods. More specifically, the present invention is directed toward the dissemination of information in an access control system having at least one non-networked reader.

BACKGROUND

Control access systems have historically been completely interconnected by wired and/or wireless connections. More specifically, readers and other types of message hosts are generally in communication with a centralized control system such as a centralized control panel. The interconnectedness of the system allows policy updates to be quickly and efficiently disseminated throughout the access control system. If a policy update (e.g., sending new access permissions to all readers) is necessary, then the centralized control panel would send a message to the networked message hosts notifying them of the new policy.

While these completely interconnected systems help to facilitate efficient policy updates they are expensive to install and maintain, especially in large facilities where a significant amount of wire and/or wireless communication devices are required to have each message host in communication with the centralized control panel. Thus, non-networked message hosts (i.e., message hosts which are not in communication with a centralized control system via a direct communication path or message hosts that have a communication path that becomes unavailable), which are also referred to as local hosts, are becoming more desirable due to their autonomy and the low cost associated with their installation and maintenance. The downside to installing non-networked message hosts is that it becomes more difficult to ensure that the non-networked message host receives policy updates.

SUMMARY

Colonies in control access systems lacking long range or direct communication between message hosts can propagate messages between message hosts by means of an intermediary message carrier. Message hosts are typically stationary objects, such as an access control reader. Message carriers are typically mobile objects, such as an access control token. A message object contains data or information, such as access control policies, that can be understood and used by the message hosts. Message objects can originate at one or more message hosts and can be used by message hosts to perform an action, such as grant access to a secure area. A message object can be introduced utilizing one or more existing members from either colony or can be newly introduced colony members. In a system containing a colony of message hosts and a colony of message carriers, the message carriers can transport a message from one message host to another, thereby propagation the message object among the colony of message hosts.

A message originating on one or more message hosts can be conveyed from the message host to a message carrier when the message host and message carrier are in close proximity to each other. If a second message carrier is subsequently put in close proximity to a message host originating a message object, the message object can be conveyed from the message host to the second message carrier. A message carrier, after gaining knowledge of the message object, can transport the message object from a message host with knowledge of the message object, such as a message host that originates a message object, to a second message host with no knowledge of the message object and then convey the message object from the message carrier to the second message host when the message carrier is in close proximity to the second message host. After the message object is conveyed to the second message host, the second message host has knowledge of the message object.

Two colony systems are used, for example, in disconnected access control models. Such systems provide a simple and elegant solution for access control without the need to connect readers to a wired network. These systems provide a secure and elegant solution to access control when cost or installation of a wired network is undesirable. While these systems have been in use for more than twenty years, the optimization of these systems has not yet been achieved.

It is therefore one aspect of the present invention to improve on the current state of the art by providing a useful, concrete, and tangible result that can be used to understand and design optimal communication in two colony systems. This program can be applied more generally to the understanding and optimization of such two colony systems that rely on message carriers to deliver message objects to non-networked message hosts.

Embodiments of the present invention define a metric that provides a measure of information dissemination performance in a system having message hosts that can communicate with each other using a message carrier as an intermediary. Exemplary systems of the type described here are mail delivery where a message, in the form of a letter, is carried from one location to another or, in nature, a colony of bees that carrier DNA from one plant to another. What these systems have in common is that a network is formed by the message carriers. The network is comprised of transient and asymmetrical connections between the hosts. A high performance system is defined here as one that is capable of efficient delivery of a message by the message carriers and distributed among the hosts. At least one embodiment of the present invention provides a method of measuring information dissemination efficiency in these systems and, when possible, to improve that efficiency.

Small World networks are characterized by localized networks that are connected to each other by critical links that provide a shortcut between otherwise distant or unconnected clusters. One popular example is the Kevin Bacon game where the goal is to find a path between any movie actor and Kevin Bacon using appearances in the same movies as connections. Connections between local clusters (movies) are made by an actor that appears in both movies.

An important difference between the actor network in the Kevin Bacon game and a network defined by message hosts and message carriers in an access control system is that a connection made by two actors appearing in the same movie is permanent and bidirectional, while the connection between two message hosts in our system is a transient and unidirectional event. This difference requires a slightly different tactic than the one typically used to study Small World networks. Rather than treating the message carrier population as vertices and the message hosts as edges, or the other way around, two distinct populations are both treated as vertices while the conveyance of a message object between these populations is treated as an edge.

This difference requires modifications to many of the standard graph-theory tools used to study networks. For example, if treated like a standard network a degree distribution would be defined using the connections from message host-to-host; but in accordance with at least some embodiments of the present invention, the degree distribution will describe connections from message host-to-carrier and message carrier-to-host.

Related to the degree distribution, an adjacency matrix will not be a square n×n lattice but will have dimensions with the number of message carriers on one side and the number of message hosts on the other. Because each event is effectively a half-step in the process of sharing a message object between two like components, the traditional adjacency matrix can be found by squaring the matrix of the two vertex system.

Another consequence of the transient connection is that the connection defined in an adjacency matrix must be replaced with a probability weight representing connection strength to create a weighted adjacency matrix. A Markov Chain Monte Carlo based on a modeled weighted adjacency matrix can be used to simulate the propagation of message objects in the two-colony system. The message-carrier-to-message-host weighted adjacency matrix, W, is the engine that describes the information flow in this two colony network.

In one embodiment, a method is provided, the method generally comprising:

determining a number of non-networked hosts requiring an update;

accessing an agent path followed by an agent with a credential operable to update ones of the non-networked hosts;

identifying at least one of the non-networked hosts will not receive the update by a deadline by the agent following the agent path;

modifying the agent path such that the at least one non-networked host will receive the update by the deadline by the agent following the modified agent path; and making the modified agent path available to a user.

It is one objective of the present invention to provide a modified agent path such that a non-networked host (i.e., readers which contain no wired connection to a centralized database and operate quasi autonomously) may be updated whereas the non-networked host would not be updated, or updated in a timely manner, by the agent following the unmodified agent path.

A Markov Chain Monte Carlo model may be used to examine the performance of a colony of message carriers to distribute message objects among a colony of message hosts. A performance measure may be defined to estimate the chance that an update will not reach its target before it is needed.

Disconnected access control networks may be modeled as two separate but interdependent populations, message carriers and message hosts. The interdependence is created because each population can only receive information from the other population when there is no direct message carrier-to-message carrier or door-to-door events, resulting in coupled partial differential equation.

Relationships found in disconnected networks may include a scaling for the total number of connections that follows the geometric mean of the number of message carriers and message hosts. In accordance with at least some embodiments of the present invention, connection strengths between message carriers and message hosts follow a Zipf-Mandelbrot distribution with a power of 2.

Security entropy of the system can be defined as a measure of the state-of-order for the system, for example it might be defined as the probability that an update will miss its target given a time dependent system state. The security entropy can be calculated and compared to sampled access control data and can be used to measure the security value against a system performance benchmark. Security entropy of a completely connected system would be zero, indicating that the system is fully updated. Disconnected or partially connected systems will have a security entropy that can be greater than zero. Remedies to reduce the security entropy and thereby improve system performance can also be proposed. Such proposals may include suggestions to alter a proposed configuration of message hosts (e.g., by altering the number, location, and/or network communication capabilities of the hosts) and message carriers (e.g., by altering the number, type, and permissions of carriers).

The Summary is neither intended or should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

BRIEF DESCRIPTION OF THE DRAWINGS

FIG. 19 illustrates an item with a trusted tag in accordance with embodiments of the present invention.

DETAILED DESCRIPTION

The invention will be illustrated below in conjunction with an exemplary access control system. Although well suited for use with, e.g., a system using access control readers and/or credentials, the invention is not limited to use with any particular type of access control system or configuration of system elements. Those skilled in the art will recognize that the disclosed techniques may be used in any data messaging application in which it is desirable to optimize information dissemination throughout the network.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Embodiments of the present invention are generally directed toward devices and methods of using such devices in a secure access system. Although well suited for use in systems and methods employing RF communication protocols, embodiments of the present invention may be suitable for use in systems employing other communication protocols including, but not limited to, optical communication protocols, magnetic communication protocols, chemical messaging, and the like.

Figure 1:
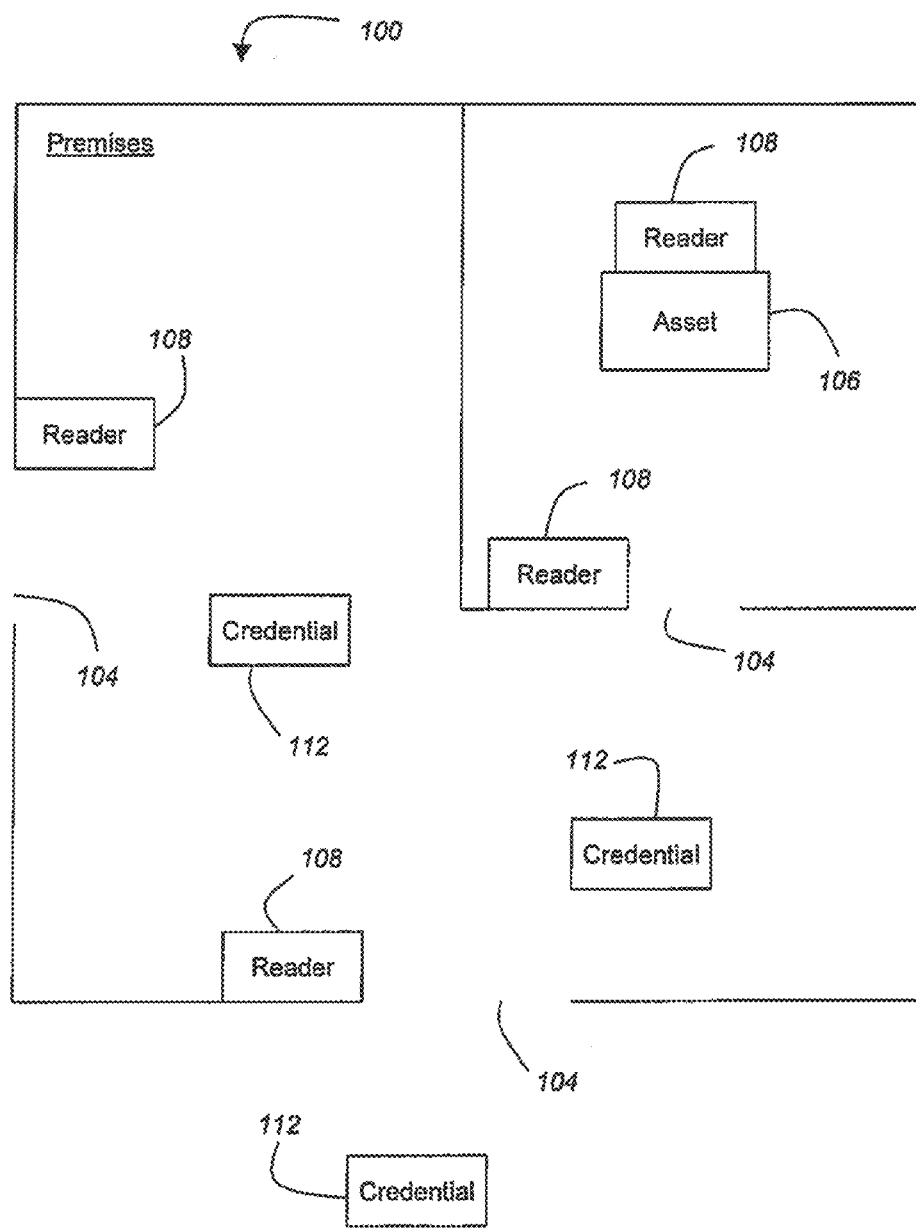
FIG. 1 depicts a secured premises in accordance with embodiments of the prior art.

Referring initially to FIG. 1, a secured premises 100 will be described in accordance with at least some embodiments of the present invention. The secured premises 100 displayed may correspond to an actual premises having access control equipment. Alternatively, the secured premises 100 may be simulated and the depicted location of the equipment may correspond to possible locations. For example, the premises may be displayed on a user interface of a computing station such as a personal computer, laptop, or the like and each of the pieces of access control equipment may represent actual equipment that may be used on a real premises.

In accordance with at least one embodiment of the present invention, the secured premises 100 may comprise a plurality of access points 104 each having a message host associated therewith. The access points 104 may comprise points of access to the interior of the premises 100. Alternatively, the access points 104 may comprise points of access to rooms within the premises 100.

In the depicted embodiment, message hosts correspond to access control readers 108. In addition to access points 104, the premises 100 may comprise one or more assets 106. Examples of assets 106 may include secured computing resources (e.g., databases, computers, laptops, servers, etc.), financial resources (e.g., bank accounts, credit accounts, financial information, etc.), physical resources (e.g., office equipment, safes, files, etc.).

The assets 106 may also comprise a corresponding message host to control/restrict/monitor access to the asset 106. In accordance with at least some embodiments of the present invention, the readers 108 may be used to control a user's access through an associated access point 104 or to an associated asset 106. A user may be issued a credential 112, which can be presented to a reader 108 when a user desires access through an access point 104 or to an asset 106. The credentials 112 may comprise authentication information that can be wirelessly communicated to the readers 108 for verification of the user's access permissions. When a reader 108 verifies that a valid credential 112 has been presented thereto, the reader 108 may then permit the user access to the associated access point 104 and/or asset 106. In accordance with at least one embodiment of the present invention access control decision may be made on the credentials 112 rather than the readers 108. Further details of such an embodiment where decisions can be made on the credential 112 are described in U.S. patent application Ser. No. 11/778,145, entitled "Method and Apparatus for Making a Decision on a Card," the entire contents of which are hereby incorporated herein by this reference.

In addition to carrying a user's validation information, the credentials 112 may be used as message carriers to carry message objects to the message hosts (i.e., readers 108). Exemplary credentials 112 may include, without limitation, Radio Frequency (RF) proximity cards, RF smart cards, magstripe cards, optically based access credentials, biometric authentication credentials, key fobs, CD-ROMS, flash drives, and any other portable medium capable of storing a message object and communicating the message object to a message host. In accordance with at least some embodiments of the present invention, at least some of the message hosts (i.e., readers 108) in the premises are non-networked, meaning that they have no direct mechanism of communication with any other message host. Instead, such non-networked message hosts rely on the message carriers to receive a message object and share message objects with other non-networked message hosts.

Figure 2:
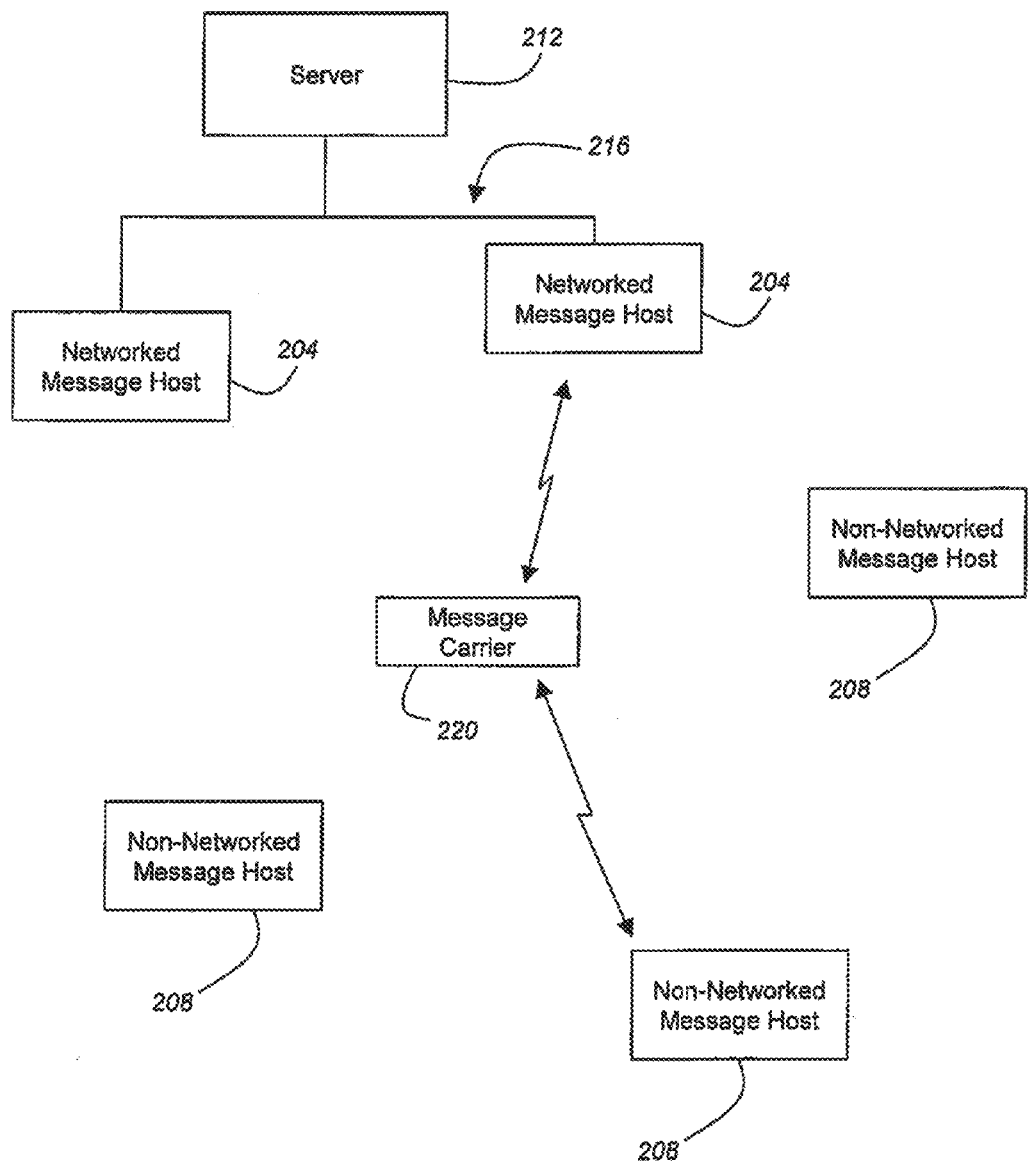
FIG. 2 depicts an access control system in accordance with embodiments of the present invention.

FIG. 2 depicts further details of a secure access system 200 in accordance with at least some embodiments of the present invention. The secure access system 200 generally includes a population of message hosts, typically in the form of access control readers. The population of message hosts may be divided into two types, namely networked message hosts 204 and non-networked message hosts 208. Networked message hosts 204 comprise the ability to directly communicate with at least one other access control device, such as another networked message host 204 or a server 212. The direct connection between the networked message hosts 204 and the other access control devices may be facilitated by a network connection 216. The network connection 216 may be in the form of a wired and/or wireless communication link.

Due to their direct connectivity to other access control devices, the networked message hosts 204 may share message objects with one another without requiring an intermediary message carrier 220. The server 212 may comprise a permissions server or some other type of centralized control panel that distributes message objects, such as access control policy information, to other networked message hosts 204. In accordance with at least one embodiment of the present invention, the networked message hosts 204 may be used as access control devices that originate message objects throughout the secure access system 200. The networked message hosts 204 may originally receive message objects from the server 212 via the network connection 216. Then, when a message carrier 220, such as a credential 112, comes within communication range of the networked message host 204, the networked message host 204 may communicate the message object to the message carrier 220. The message carrier 220 may then store the message object and convey the message object to any other message host that it communicates with. In this way, the message carrier 220 can be used to carry a message object from a networked message host 204 to a non-networked message host 208.

In accordance with at least one embodiment of the present invention, the message carrier 220 comprises an RF enabled credential and the message hosts 204, 208 comprise RF enabled readers. When the message carrier 220 is brought within a predefined communication range of the message host 204, 208, an RF dialog may be established between the message host 204, 208 and message carrier 220. During this communication dialog, the message host 204, 208 may communicate any type of active or most current message objects to the message carrier 220. The message carrier 220 may, in a likewise fashion, communicate any type of active or most current message objects is has stored on its memory to the message host 204, 208. This allows the message carrier 220 to supply new message objects to the message host 204, 208 and receive new message objects from the message host 204, 208. The message carrier 220 can, therefore, be used as a mechanism for the non-networked message hosts 208 to share any message objects they have with other devices in the secure access system 200.

In accordance with at least some embodiments of the present invention, message carriers 220 may only be allowed to send and/or receive message objects to/from message hosts 204, 208 after the message carrier 220 has been authenticated by the message host 204, 208 and the message host 204, 208 has determined that the message carrier 220 currently has permission to access the access point 104 or asset 106 associated with the message host 204, 208. This is particularly useful to help deter the transmission of bad or otherwise unauthorized message objects throughout the secure access system 200. The message hosts 204, 208 may restrict accepting a message object from a message carrier 220 until it has authenticated the message carrier and determined that its access permissions are valid. Additionally, the message hosts 204, 208 may refrain from sending a message object to message carriers 220 until there has been a proper authentication and validation of the message carrier 220.

Figure 3:
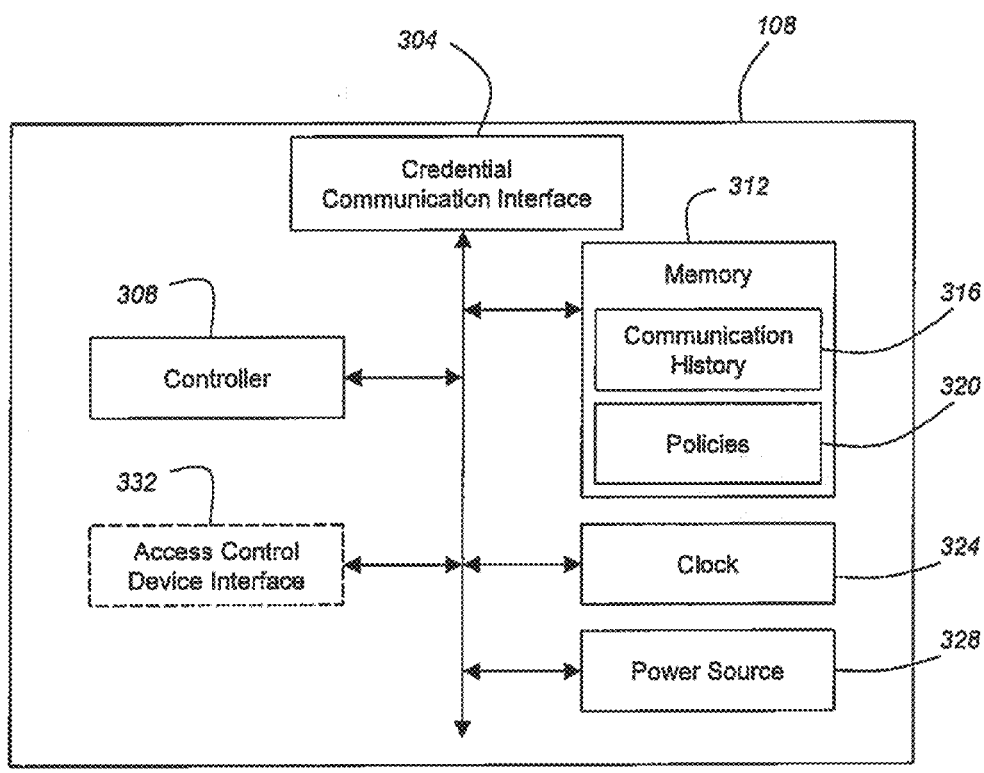
FIG. 3 depicts components of a reader in accordance with embodiments of the present invention.

Referring now to FIG. 3, details of a reader 108 or similar type of message host 204, 208 will be described in accordance with at least some embodiments of the present invention. The reader 108 generally comprises the capability to automatically read data, typically in the form of a message object and/or validation information, from a credential 112. The reader 108 may also be capable of writing data, typically in the form of a message object, back to the credential 112.

The reader 108, in accordance with at least one embodiment, comprises a credential communication interface 304 used to communicate back and forth with the credential 112. The credential communication interface 304 may comprise an RF communication interface (e.g., an RF antenna), a magnetic communication interface (e.g., a magnetic stripe reader), an optical communication interface (e.g., an infrared detector and transmitter), an electrical contact communication interface, or any other means of communicating information to/from a credential 112.

Connected to the communication interface 304 is a controller 308. In one embodiment, the controller 308 includes a microprocessor, a random number generator, and a cryptographic coprocessor. The controller 308 is capable of properly modulating/demodulating data sent to and received from external devices such as the credential 112. The controller 308 controls and determines how the reader 108 behaves when a credential 112 is presented to it. The controller 308 may include any general-purpose programmable processor, digital signal processor (DSP) or controller for executing application programming. Alternatively, the controller 308 may comprise a specially configured Application Specific Integrated Circuit (ASIC).

The controller 308 may also be provided with control circuitry capable of manipulating an access control device. The access control device is designed to secure the point of access 104 or asset 106 being protected by the reader 108. The controller 308 is enabled to communicate with the access control device via the access control device interface 332. Examples of a typical access control device include, without limitation, an electronic lock, a magnetic lock, or an electric strike for a door, a lock for a computer system, a lock for a database, a lock on a financial account, or a lock on a computer application. In one embodiment, the controller 308 actuates the access control device by sending a signal to the access control device via the access control device interface 332 based on results of an access decision made by the controller 308. Optionally, the access control device may be integral to the reader 108 in one embodiment, in which case an access control device interface 332 would not be necessary. In an alternative embodiment, an access control device is external to the reader 108, thus necessitating the interface 332. Examples of an access control device interface 332 include any type of data port such as a USB port, serial data port, parallel data port, a convention wire, a wireless communication port such as a Bluetooth data interface, or any other type of wired or wireless communication interface.

In addition to an access control device interface 332, the reader 108 may further comprise a memory 312. The memory 312 may be used to store application data, the host unique ID, a communications history log 316, a set of access policies 320 or other types of message objects, and any other functions that can be executed by the controller 308. The memory 312 may comprise volatile and/or non-volatile memory. Examples of non-volatile memory include Read Only Memory (ROM), Erasable Programmable ROM (EPROM), Electronically Erasable PROM (EEPROM), Flash memory, and the like. Examples of volatile memory include Random Access Memory (RAM), Dynamic RAM (DRAM), Static RAM (SRAM), or buffer memory. In one embodiment, the memory 312 and the controller 308 are designed to utilize known security features to prevent unauthorized access to the contents of the memory 312 such as side channel analysis and the like.

The communication history log 316 may provide a location in memory where a register of all communications for the reader 108 is stored. The communication history log 316 may be used in connection with determining what credentials 112 are typically presented to a particular reader 108 as well as when and with what frequency such credentials 112 are presented to the reader 108. Thus, the communication history log 316 may serve as a mechanism to model the information flow in a particular secure access system 200.

The reader 108 may further comprise a clock 324. The clock 324 is depicted as internal to the reader 108, but the clock may also be external to the reader 108. The clock 324 tracks the current time. The controller 308 may be adapted to read the time from the clock 324 and provide that time to a credential 112, for the credential's communication history log. The clock 324 may further be employed to determine if the holder of a particular credential 112 is currently allowed access to an asset protected by the access control device 312. The controller 308 may also reference the policies 320 in memory 312 to determine if a credential 112 is allowed access to an associated access point 104 or asset 106 based on the current time as determined by the clock 324. The controller 308 may also reference the clock 324 to determine when a particular policy 320 should be implemented, in the event that one or more policies 320 is set to have a delayed start and comprises a timer mechanism.

A power source 328 may also be included in the reader 108 to provide power to the various devices contained within the reader 108. The power source 328 may comprise internal batteries and/or an AC-DC converter such as a switch mode power supply or voltage regulator connected to an external AC power source.

Although not depicted, a reader 108 may further include a communication interface that provides communication capabilities between the reader 108 and external servers or other network nodes. Such a communication interface may include a USB port, a modem, a network adapter such as an Ethernet card, or any other communication adapter known in the art. These types of communication interfaces are typically only included in networked message hosts 204.

Figure 4:
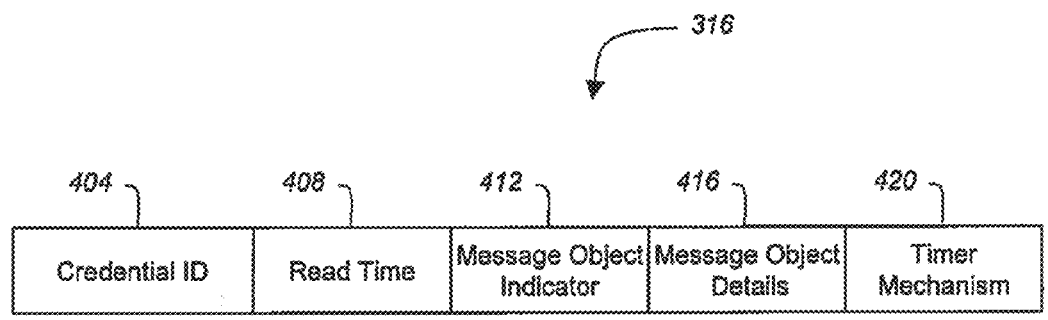
FIG. 4 depicts a data structure used to organize communication histories and policy information in accordance with embodiments of the present invention.

Referring now to FIG. 4, additional details of the communication history log 316 will be described in accordance with at least some embodiments of the present invention. The communication history log 316 may comprise a number of different data fields, such as, a credential ID field 404, a read time field 408, a message object indicator field 412, a message object details filed 416, and a timer mechanism field 420. The communication history log 316 may be used to store communications history for an associated reader 108. The communications history 316 may be refreshed on a periodic (e.g., daily, weekly, monthly, yearly) basis. Alternatively, the communications history 316 may be maintained for the life of the reader 108, in which case additional memory capacity may need to be added to the reader 108 during the course of its life.

The credential ID field 404 may comprise identification information for each credential 112 presented to the reader 108. The information in the credential ID field 404 may include a unique card number assigned to the credential 112, a user's name associated with the credential 112, or some other information that uniquely identifies the credential 112. Non-unique information may also be maintained in the credential ID field 404 such as site codes or other information that identifies a group to which the credential 112 belongs.

The read time field 408 may comprise information relating to the time when a particular credential 112 communicated with the reader 108. The value in the read time field 408 may be obtained by referencing the clock 324. The read time may be maintained to any type of granularity (e.g., months, weeks, days, hours, seconds, etc.), depending upon the required accuracy of read time. If no accurate read time is required, then the read time field 408 may simply provide an indication of the sequence in which a particular credential 112 was read relative to another credential 112.

The message object indicator field 412 may contain information showing whether a particular credential 112 sent a policy or similar type of message object to the reader 108 and/or whether the reader sent a policy or similar type of message object to the credential 112. The message object indicator field 412 may also provide identification information for certain message objects. More specifically, message objects may be circulated throughout the secure access system 200 with a particular name or identifier. When the message object is received by a new access control device, the message object identifier may be maintained in the message object indicator field 412 so that a reader 108 has a quick reference record of the message objects which it has received. Additionally, message object indicators may be provided for message objects which are transmitted to credentials 112. This allows a system administrator to determine which credentials 112 have a particular message object stored thereon, without actually checking the credential 112 itself.

The message object details field 416 may contain details about the policy or message object which was transmitted to/from the reader 108. In accordance with at least one embodiment of the present invention, when a message object corresponds to a new access control policy, the message object details field 416 incorporates a definition of the access control update. Such access control updates generally include a change in access rights for at least one credential 112 to access at least one point of access 104 or asset 106 associated with reader 108. For example, if access permissions for a particular credential 112 have been revoked (e.g., because a user associated with the credential 112 no longer works for a company maintaining the premises 100), then the message object details field 416 may incorporate instructions telling all readers 108 to stop allowing the identified credential 112 access to associated access points 104 and/or assets 106. Thus, information maintained in the message object details field 416 (and message objects in general) typically includes an identification of at least one credential 112 and an access rule for that at least one credential 112. Alternatively, the message object may correspond to an application update for one or more applications stored on the reader 108, in which case the message object details field 416 may comprise the updated application as well as instructions for the reader 108 to install the new application. Another type of message object used in accordance with at least some embodiments of the present invention may include a reader enable update. In this particular embodiment, the readers 108 may be adapted to stop allowing access to any credential 112 after a predetermined amount of time unless the reader receives a new message object renewing the reader's 108 activity subscription.

The message object, in addition to providing instructions for the reader 108 (or credential 112 in some applications) may also include a timer mechanism 420. The timer mechanism 420 may define a life span for a particular message object. The information in the timer mechanism field 420 may include details related to the life span of the message object. More specifically, the timer mechanism 420 associated with a particular message object may cause the message object to become active only after a predetermined time. In other words, a delayed policy update may be implemented with message objects having timer mechanism 420 that define a certain time after the message object was first distributed before the message object becomes active (i.e., the timer mechanism may define a predetermined time in which a reader 108 should begin implementing the instructions contained within the message object). The timer mechanism 420 may also define how long a particular message object is to remain active. This particular implementation may utilize the timer mechanism to deactivate the message object after a predetermined amount of time, unless a new message object is received extending the timer mechanism. Accordingly, information in the timer mechanism field 420 may be used to define the beginning and end of an associated message object's lifetime. In accordance with at least some embodiments of the present invention, the timer mechanism may be appended to a message object at the beginning/end of the message object details or in a header of the message object. A flag may also be included in communications that contain a message object if the message object contains a timer mechanism 420. Such a flag will allow the receiving access control device to search the message object for the relevant timer mechanism.

Figure 5:
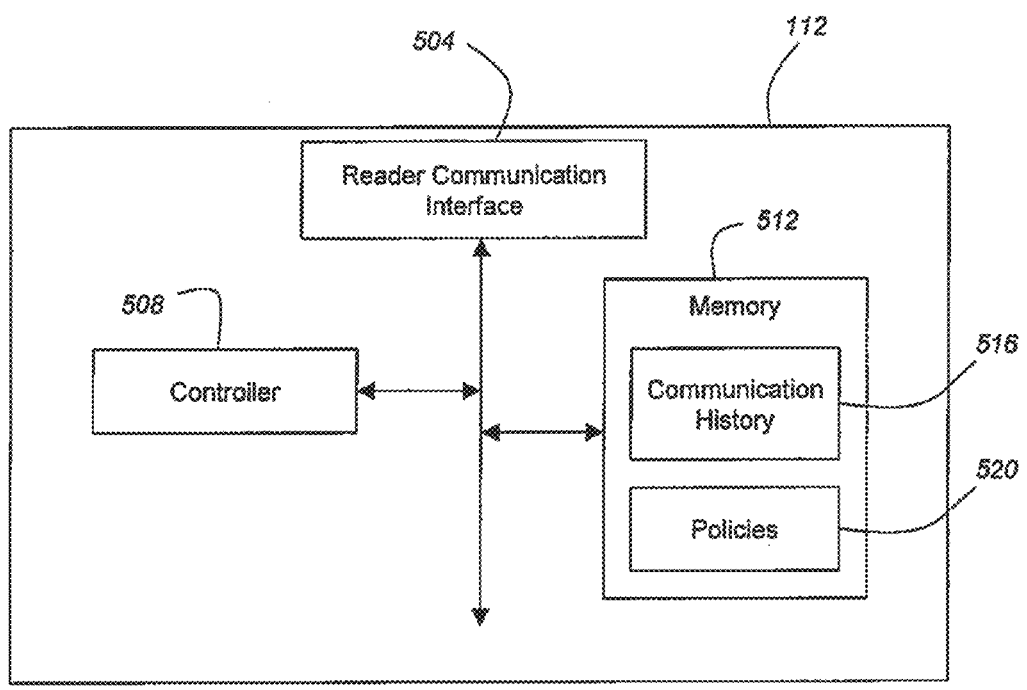
FIG. 5 depicts components of a credential in accordance with embodiments of the present invention.

FIG. 5 depicts an exemplary credential 112 which will now be described in accordance with at least some embodiments of the present invention. The credential 112 may include a communication interface 504 that allows the credential 112 to communicate with external devices such as the reader 108. The communication interface 504 may comprise an RF antenna that allows the credential 112 to receive and transmit data without contact. In other embodiments a magnetic, optical, or electrical contact communication interface 504 may be utilized.

A controller 508 may be connected to the communication interface 504. The controller 504, in one embodiment, includes a microprocessor, a random number generator, and a cryptographic coprocessor. The controller 508 may include any general-purpose programmable processor, digital signal processor (DSP) or controller for executing application programming. Alternatively, the controller 508 may comprise a specially configured application specific integrated circuit (ASIC). Similar to the controller 308 on the reader 108, the controller 508 includes known security features that substantially prevent unauthorized access to the contents of memory 512.

The memory 512 typically comprises non-volatile memory, such as flash memory. Non-volatile memory is generally used because the credential 112 is preferably a passive credential meaning that it does not have an internal source of power. Rather, the credential 112 uses energy from an RF field created by the reader 108 to power its components. Contents of the memory 512 may include a communication history log 516, policies 520 and other message objects, and any other applications to be executed by the credential 112. The communication history log 516 is similar to the communication history log 316 stored on the reader 108 except the credential ID field 404 is replaced with a reader ID field, where the reader ID field identifies reader with which the credential 112 has communicated with. More particularly, the reader ID field identifies readers 108 to which the credential 112 has transmitted message objects and readers 108 from which the credential 112 has received message objects.

In an alternative embodiment the credential 112 may be provided with an onboard power supply. Such credentials 112 are known as active credentials 112. An active credential 112 can keep its own trusted time that can be synchronized with the network devices during interactions with readers 108, for example. This way the credential 112 can also control when certain message objects having a timer mechanism 420 should be activated and/or deactivated based on a reference to the internal clock.

Figure 6:
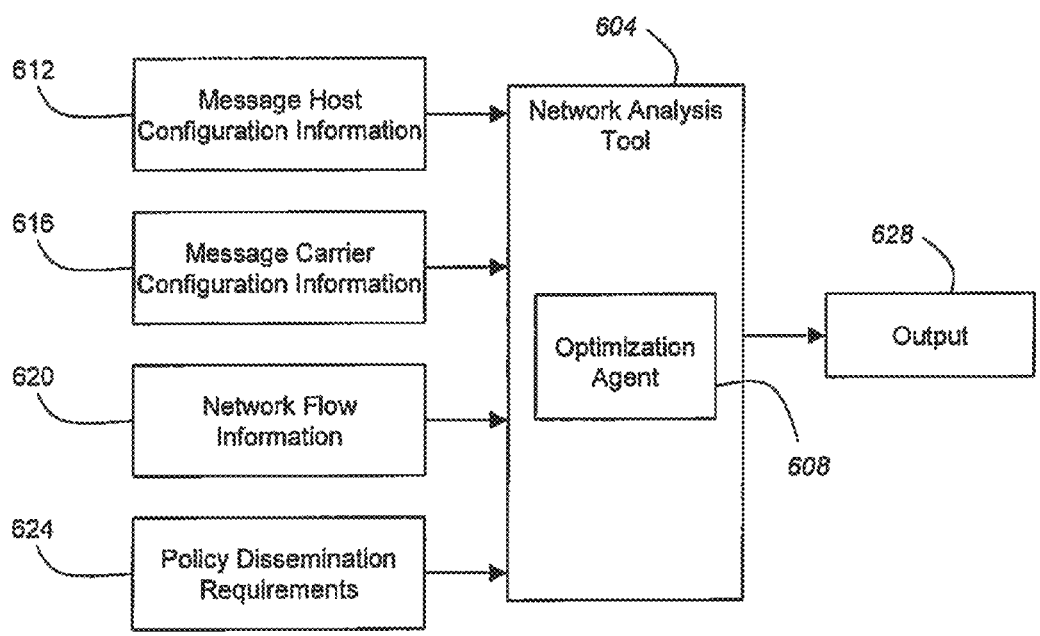
FIG. 6 depicts a network analysis tool used to optimize information dissemination in the access control system in accordance with embodiments of the present invention.

With reference now to FIG. 6, a network analysis tool 604 will be described in accordance with at least some embodiments of the present invention. The network analysis tool 604 may reside on and be executed by a processing platform such as a server, computer, laptop, etc. The network analysis tool 604 may be used to analyze the both simulated secure access systems 200 and actual secure access systems 200. More specifically, the network analysis tool 604 may employ an optimization agent 608 to optimize the efficiency with which information (e.g., a message object) is disseminated through an access control system having at least one non-networked message host 208. In accordance with at least some embodiments of the present invention, the optimization agent 608 may be adapted to analyze a proposed configuration of access control devices (e.g., location and network capabilities of message hosts 204, 208 and number of credentials 112) and then suggest changes to the proposed configuration that would optimize the dissemination of message objects through the secure access system 200. The optimization agent 608 may also be adapted to analyze actual configurations of access control devices and then either provide statistics related to the flow of message objects in the secure access system 200 or provide suggestions for optimizing the dissemination of message objects through the secure access system 200.

The inputs to the network analysis tool 604 may include, for example, message host configuration information 612, message carrier configuration information 616, network flow information 620, and policy dissemination requirements 624. The message host configuration information 612 may include the number and location of message hosts 204, 208 in the secure access system 200 as well as each message hosts' network capabilities. More specifically, the message host configuration information 612 may indicate whether a particular message host is a networked message host 204 or non-networked message host 208, and if it is a networked message host 204 what other access control devices the networked message host 208 is capable of communicating with directly. The message host configuration information may be provided as actual data representing an actual layout of message hosts 204, 208 or as simulation data representing a proposed layout of message hosts 204, 208.

The message carrier information 616 may include the number and type of message carriers 220 in the secure access system 200. Additionally, the message carrier information 616 may define the access permissions of certain credentials 112. This information may be worth noting in embodiments where credentials 112 are limited to sending and receiving message objects with message hosts 204, 208 only when they are authorized to access assets 106 or access points 104 associated with the message hosts 204, 208. It is in these particular embodiments where such information will affect the dissemination of a message object through the secure access system 200.

In a simulated secure access system 200, the network flow information 620 may be estimated based on typical information flow conditions. More specifically, the network flow information 620 may be based on the actual network flow information of other secure access systems 200 having a similar configuration to the secure access system 200 being simulated. In an analysis of an actual secure access system 200, however, the network flow information 620 may either be simulated or determined based on historical network flows of the system 200. More specifically, the network flow information 620 may be determined by referencing the communication history 316, 516 of the access control devices to determine what message carriers 220 traditionally communicate with what message hosts 204, 208. The level of detail of this information 620 may be based upon the level of detail of information maintained in the communication history logs 316, 516. For example, if read time is stored to the second, then the same granularity of information may be incorporated into the network flow information 620.

The policy dissemination requirements 624 may be user defined. These requirements may be provided in a number of different ways (e.g., either as restrictions or as goals). The policy dissemination requirements 624 specify how quickly message objects should be shared throughout a particular secure access system 200. The policy dissemination requirements 624 may be defined in terms of a required number of access control devices (e.g., a percentage of message hosts 204, 208 and/or message carriers 220) that need to receive a particular message object within a certain time or the amount of time in which a certain number of access control devices need to receive a particular message object.

The network analysis tool 604 may receive all of the above-described input information and employ the optimization agent 608 to determine various ways in which message objects can be distributed through the secure access system 200 more efficiently. In accordance with at least some embodiments of the present invention, one measure of system performance as determined by the optimization agent 608 is the degree of separation between a message originating host 204, 208 and other message hosts 204, 208 or message carriers 220 in the system 200. The degree of separation counts the minimum number of message conveying steps expected for the message object to reach a selected message host 204, 208 or message carrier 220 in a two-colony system (e.g., a secure access system 200 comprising networked and non-networked message hosts 204, 208).

Figure 10:
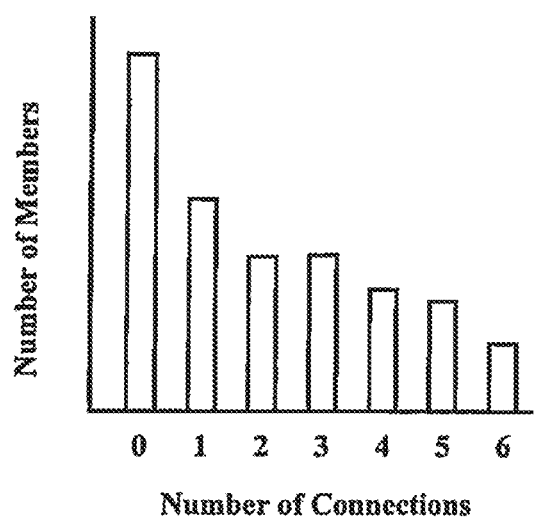
FIG. 10 is a chart illustrating a degree distribution of connections with members in accordance with embodiments of the present invention.

In accordance with at least some embodiments of the present invention, the standard definition for connectedness, k, of a network does not satisfy the requirements of a two-colony system. The connectedness, $k_c$, of a message carrier can be alternatively defined as the number of unique message hosts 204, 208 that were visited by that message carrier 220 at least once during a given time period. Similarly each message host 204, 208 has a value, $k_h$, representing the number of unique message carriers 220 that it shared a transaction with during the same time period. Histograms of k for message carriers and message hosts can be used to categorize the type of network, an example of which is depicted in FIG. 10.

Most networks, in general, fit into one of three degree distribution classifications: Scale Free Networks have fat-tails, indicating more long range connections, and are characterized by a power law; Geometric Networks can be hierarchical and have an exponential distribution in k; Random Networks are more localized and follow a Poisson distribution.

An alternative to matching a distribution to the degree distribution is to perform spectral analysis to the message host-to-message host adjacency matrix $W_{hh}$ or message carrier-to-message carrier matrix $W_{cc}$ found by squaring the message carrier-to-message host adjacency matrix $W_{ch}$.

Spectrum of random networks will follow the Wigner Semi-circle, while scale free networks will have a triangular shape. Structured networks, such as hierarchical networks, will have more complex spectra.

Experimental and Modeled Value of k

Modeling degree distribution requires two pieces of information, one is the sum of all connections, $\Sigma k$, and the other is the shape of the distribution. For purposes of this illustration, the k-distribution is assumed to be exponential.

Measured values of $\Sigma k$ indicate that the total number of connections can be modeled based on the number of message carriers, $n_c$, and the number of doors, $n_r$.

Sparseness of Message Carrier—Message Host Adjacency Matrix ($A_{ch}$)

The total sum of connections in the system 200 can be used to calculate the sparseness of the adjacency matrix. The connected fraction can be found by dividing the number of expected connections by the number of possible connections. Then the fraction of zeros, ZF, is found by subtracting the connected fraction from one.

$$ZeroFraction = 1 - \frac{\sum k}{n_r \cdot n_c}$$

Modeling the Message carrier-Message host Adjacency Matrix ($A_{ch}$)

When the degree distribution is well known (e.g., in an actual secure access system 200), a general approach can be used to find an appropriate generating function for the adjacency matrix. If the degrees are assumed to follow an exponential k-distribution profile and matching constraints for the modeled value of k for both the message carrier and message host populations, then the adjacency matrix is filled by assigning random elements in $A_{ch}$ a connection value of 1 based on the probiblity P(C, H), where message carriers and message hosts. This process is repeated until all $\Sigma k$ connections have been assigned.

Weighted Adjacency Matrix ($W_{ch}$)

The adjacency matrix, A, is then modified to become a weighted adjacency matrix, W, by replacing the connections in A with the event probability. The probability can be found experimentally by sampling the events from operational access control sites over a specified period of time. In the adjacency matrix, a value of one indicates that a transient connection existed at least once during the measurement period, and the weighted matrix specifies the strength of that connection. A zero in the adjacency matrix indicates a zero probability for the specified connection in the weighted matrix.

Plotting the number of events in each non-zero element in experimental data shows a power law distribution for the connection frequency probability mass function.

The probability mass function of connection strengths may follow a power-law distribution for waiting time, particularly the generalized Zipf function known as the Zipf-Mandelbrot law:

$$P_w(k; N, q, s) = \frac{\frac{1}{(k+q)^s}}{\sum_{i=1}^{N} \frac{1}{(i+q)^s}}$$

One benefit of using this function in the analysis agent is the cutoff of the fat-tail typical in power law distributions by the normalization constraint, k<N. The experimental value for s in the equation is very close to 2 for some systems. The analysis agent can utilize this definition of $P_w$ by setting s=2 and defining a relationship for q based on population inputs.

Each element in $A_{ch}$ is assigned a connection strength drawn from this distribution to create the weighted adjacency matrix, $W_{ch}$. After assigning weights to $W_{ch}$ the matrix, is normalized to make the sum of probabilities equal to one.

A bias may be utilized by the analysis agent to represent the phenomena seen in actual systems 200 to produce a probability distribution that has a higher likely connection strength in the weighted adjacency matrix $W_{cr}$ for vertexes that are connecting high k colony members. The analysis agent may also modify the connection strength based on time.

Markov Chain Monte Carlo

The weighted adjacency matrix is used along with a pair of state vectors for each update issued to the system. The two state vectors respectively record which message carriers and which message hosts have received the update via a message object. At each step of a Markov Chain Monte Carlo (MCMC) a connection is randomly drawn from the weighted adjacency matrix. The states of the selected members are checked and if one and only one of the components has the update then the update is propagated to the other member. If both or neither members has an update then the result is null. Here interest lies in following the state vector, Γ, with each step rather than finding an equilibrium state (which can be assumed to be a vector of fully updated components).

The propagation of information in the message carrier population, $\Gamma_c$, depends on both the number of message hosts that have the information, $\Lambda_r$, and the number of message carriers without the knowledge of the message object available to receive a message object. Similarly the velocity of information in the message host population depends on both the number of message carriers and message hosts with the message.

$$\Gamma_c = f_c(\Lambda_c, \Lambda_h) \quad \Gamma_h = f_h(\Lambda_c, \Lambda_h)$$

Velocity, Γ, is the time (or event) derivative of the position (or number), Λ. This leads to two coupled partial differential equations in Λ, e.g. if Λ is a function of time:

$$\frac{\delta \Lambda_c}{\delta t} = f_c(\Lambda_c, \Lambda_h) \text{ and } \frac{\delta \Lambda_h}{\delta t} = f_h(\Lambda_c, \Lambda_h)$$

This codependence of information flow results in a self-limiting system where neither the message carrier population nor message host population will tend to get far ahead of the other. While this is a general rule, there are conditions where one velocity can initially be faster than the other.

In the equations above the velocity can be measured as either the propagation of the update per event, Λ(e) or per time, Λ(t). The natural unit used by the analysis agent in its calculations is based on events. A relationship between event units and time units can be used to convert the results to units of time.

Model Results

Figure 11:
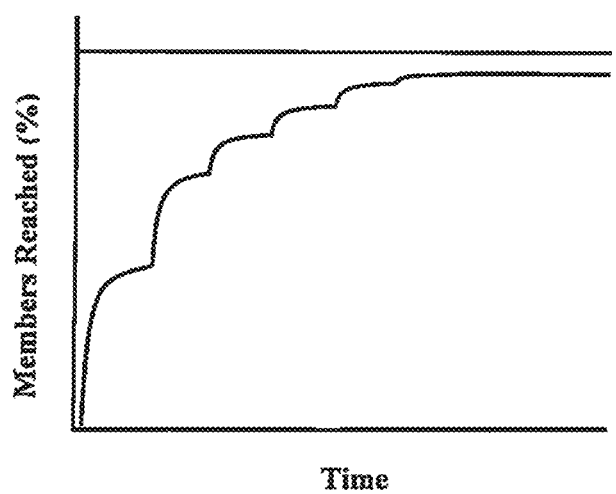
FIG. 11 is a chart illustrating message propagation through the access control system as a function of time in accordance with embodiments of the present invention.

Performance of message delivery in an operational two colony system can be studied (e.g., by the network analysis tool 604) by constructing the weighted adjacency matrix, $W_{cr}$, based on data from a one colony system with the conveyance of a message object being inferred when a message carrier 220 visits a first message host 204, 208 and then a second message host 204, 208. The weighted adjacency matrix is used to propagate information in a Markov process. The simplest model has just two input values, the number of message carriers, $n_c$, and the number of message hosts, $n_r$. A message is initialized on one or more colony members and allowed to flow through the system. Exemplary model results (e.g., output 628) obtained by the network analysis tool 604 are depicted in FIG. 11.

Generally depicted on the graph is the population of either the message carriers, $\Lambda_c$, or the message hosts, $\Lambda_h$, modeled from actual site data (e.g., communication history logs 316, 516), that have received or were initialized with a message object. In accordance with at least one embodiment of the present invention, the line is the average of multiple MCMC trials.

Model Improvements

In accordance with at least some embodiments of the present invention, the optimization agent 608 may be operable to generate a number of different outputs 628 depending upon whether it is analyzing a proposed layout of a secure access system 200 or an actual layout of a secure access system 200. Examples of the types of outputs 628 which may be generated by the optimization agent 608 will be discussed in further detail below.

Loop Events

Loop events are identified as diagonal components in the host-to-host adjacency matrix, $W_{hh}$, where $W_{hh}$ is a square matrix resulting from multiplying the weighted adjacency matrix by its transpose. These events affect the system performance by taking away from the number of possibly productive event, essentially acting to lower the effective number of events in a given time period. The optimization agent 608 may suggest configuration changes to reduce the number of loop events.

Time Dependent Adjacency Matrix ($W_{cr}$)

As mentioned earlier, connection strengths in the weighted adjacency matrix change over time. Connection strengths may have a diurnal cycle caused by variations in activity levels during the day. The connection strengths may also have weekly components due to lower activity on weekends and may also have annual cycles due to holidays, etc. Connection strengths can also change relative to each other due to periodically changing traffic patterns. In a two-colony system containing message objects transported by message carriers 220 that are constrained to pass particular message hosts 204, 208 there will be a beneficial effect to the efficiency of the system. Accordingly, the optimization agent 608 may provide as an output 628 suggestions to enhance connection strengths, for example by suggesting additional constraint points be included in the secure access system 200.

Free Ride Events

In a system that constrains message carriers 220 thereby requiring them to visit specific message hosts 204, 208, it may increase the possibility that one or more second message carriers 220 will "piggy back" or "tailgate" past a message host 204, 208 by bypassing the message host when a contemporaneous first message carrier communicates with the message host and fulfills the communication requirements. When tailgating occurs it is possible for message carriers 220 to bypass message hosts 204, 208 without delivering or receiving a message object. There will also be more opportunities for tailgating when the message carrier 220 population is large compared to the message host 204, 208 population so that the average $k_r$ is high. Thus, the optimization agent 608 may suggest ways in which tailgating may be reduced, for example by increasing the number of message hosts 204, 208 in the system 200 or by suggesting additional security measures which can be taken to reduce tailgating.

Security Entropy

An important measure of a two-colony message system is its ability to maintain an environment that is current with respect to message object updates. These systems have a level of uncertainty in the currentness of information for all members in the system. The term "security entropy" is used herein to describe the chance than a message update (i.e., a message object) is available but not delivered in time due to the uncertainty in the system. A failure can be defined as an event between a message carrier 220 and a message host 204, 208 that occurs before the update has propagated to either member. The chance that an update will fail is the product of the chance of an event and the chance that neither member has received updated message object. The value determined by this calculation may be provided by the analysis tool in the output 628 to either help design a communication system 200 configuration or to make improvements to an operational communication system 200 configuration.

Improving System Performance

In addition to providing, as an output 628, statistics related to the flow of information in the secure access system 200, the network analysis tool 604 may employ the optimization agent 608 to determine if there are any ways to more quickly disseminate a message object throughout the secure access system 200. Such determinations made by the optimization agent 608 may be provided as suggestions to a user in the form of an output 628. Examples of such suggestions will be described in further detail below.

Select Individuals for Initial Update

The invention described in this analysis so far is generally based on the distribution of message objects in a two colony system where there the message object update is initiated with a single member and then allowed to spread throughout the system 200. When an update is initiated through a single individual in the system (e.g., a single originating access control device), the unique characteristics of the chosen individual can have a significant impact on the system performance. It is not always possible to choose the initiation point, but in systems that provide the choice an individual in the system can be chosen to optimize cost, convenience, and performance. Typically, a high k-value is beneficial in spreading information, but it is also important to note that initializing message carriers 220 can spread information faster in the message host 204, 208 population and vice versa. Another important consideration is taking advantage of the constraints that cause message carriers 220 to visit particular message hosts 204, 208, which has the dual benefit of producing a component with a high k-value with the additional benefit of a high connection strength with the message hosts 204, 208. Furthermore, in systems with a strong diurnal cycle, the benefit from such constriction points can be most pronounced at the beginning of the day, making the system 200 efficient at distributing message objects early in the update cycle. All of these factors may be considered when the optimization agent 608 suggests an originating secure access device, which can correspond to either a message carrier 220 or message host 204, 208.

More Connected Components

Having more colony members initialized with the message object update has a direct impact on the update probability, $P_{nu}(t)$. This improvement gives both a better starting position and a better initial rate for the update to propagate making it a useful tool for controlling performance. Accordingly, the optimization agent 608 may suggest that one or more previously non-networked message hosts 208 have their communication capabilities altered to make them become a networked message host 204. The optimization agent 608 may also suggest which access control device the message host should be connected to.

Pre-Launched Updates

When message objects can be released into a system in advance of their eventual need then a pre-launch of the updates with a delayed "activation" will greatly improve the apparent performance of the message delivery system. The delayed activation may be facilitated by incorporating a timer mechanism 420 into the message object such that the message object is activated as some point in time after it is initially distributed into the system 200.

Forced Updates

One of the problematic issues for message object delivery in a two colony network is the concern that an individual in one or both colonies is missed altogether in the updating process. While a well maintained system 200 may keep components updated on average, some components can miss updates for long periods of time. To address this concern a forced update can be required by the system. Forced updates can be implemented either on a regular scheduled or required after a period of inactivity. Again, the timer mechanism 420 may be utilized to have a particular message host 204, 208 or message carrier 220 become inactive after a predetermined amount of time unless it receives a new message object. This will force users of the message carriers 220 to go and obtain a new message object on a periodic basis.

A combination of Pre-Launch Updates and Forced Updates can be used to produce a zero entropy delayed-update.

Figure 7:
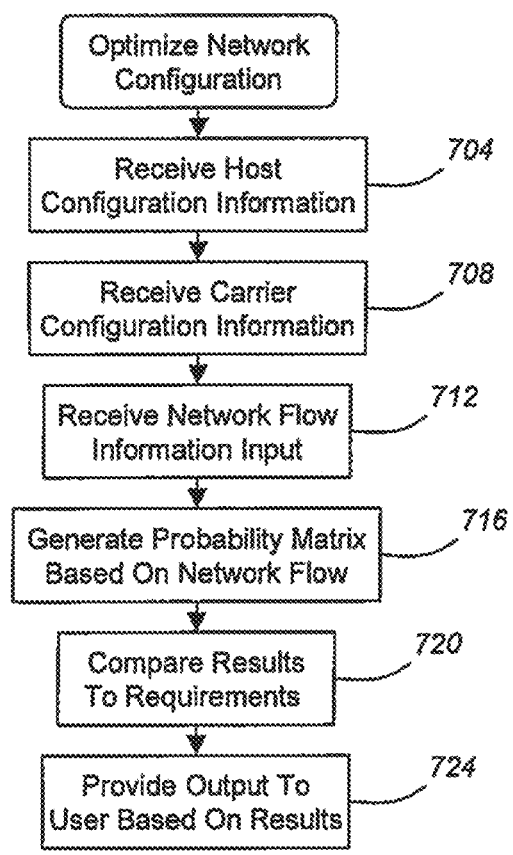
FIG. 7 is a flow chart depicting a method of optimizing a network configuration with respect to information dissemination in accordance with embodiments of the present invention.

Referring now to FIG. 7, a method of optimizing the configuration of a secure access system 200, particularly in a simulation environment, will be described in accordance with at least some embodiments of the present invention. The method is initiated when the network analysis tool 604 receives message host configuration information 612 (step 704). The message host information 612 may include information related to the number, location, and type (e.g., networked or non-networked capabilities) of each message host 204, 208 in a secure access system 200.

The network analysis tool 604 then receives the message carrier configuration information 616 (step 708). This information may include the number and types of message carriers 220 in the secure access system 200 as well as the access permissions associated with each message carrier 220.

Thereafter, the network analysis tool 604 receives the network flow information 620, which defines potential ways in which message carriers 220 will travel through the secure access system 200 (step 712). More specifically, the network flow information 620 may be based on data received from communication logs of other access control devices in similar secure access systems. In a simulation, the flow information 620 may also include predicted times when certain message carriers 220 will communicate with certain message hosts 204, 208.

Once the network analysis tool 604 has received the necessary inputs to simulate the activity of the secure access system 200, the network analysis tool 604 proceeds by generating a probability matrix based on the network flow (step 716). The probability matrix may include probabilities related to whether certain access control devices (e.g., message hosts 204, 208 and/or message carriers 220) will receive a message object within a predetermined time after the message object is introduced into the secure access system. Additionally, the probability matrix may also provide information showing the number of access control devices that will receive a message object within a predetermined time to within a predetermined probability.

A Markov process may generate the probability matrix as described above. The resulting probability matrix may then be compared to information (e.g., in the form of a message object carrying new access control policy information) flow requirements for the secure access system (step 720). The results of that comparison may then be provided as output 628 to a user of the network analysis tool 604 (step 724). More specifically, if the probabilities in the matrix meet or exceed the information flow requirements, then the network analysis tool 604 may indicate that the proposed configuration meets the requirements. Alternatively, if the information flow requirements are greatly exceeded, the network analysis tool 604 may suggest ways to decrease the cost of implementing the proposed secure access system 200. For example, the network analysis tool 604 may indicate on the user interface which networked hosts 204 may be changed to a non-networked host 208 while still meeting the information flow requirements. This indication may be made by coloring the identified message host in a different color or shading it in a different manner from the other message hosts 204, 208. Alternatively, if the information flow requirements are not met, then the network analysis tool 604 may identify certain message hosts 204, 208 that should either be relocated or have their communication capabilities changed. These identified message hosts 204, 208 may also be highlighted on the user interface and the network analysis tool 604 may further highlight the area in the premises 100 where another message host 204, 208 should be placed.

Figure 8:
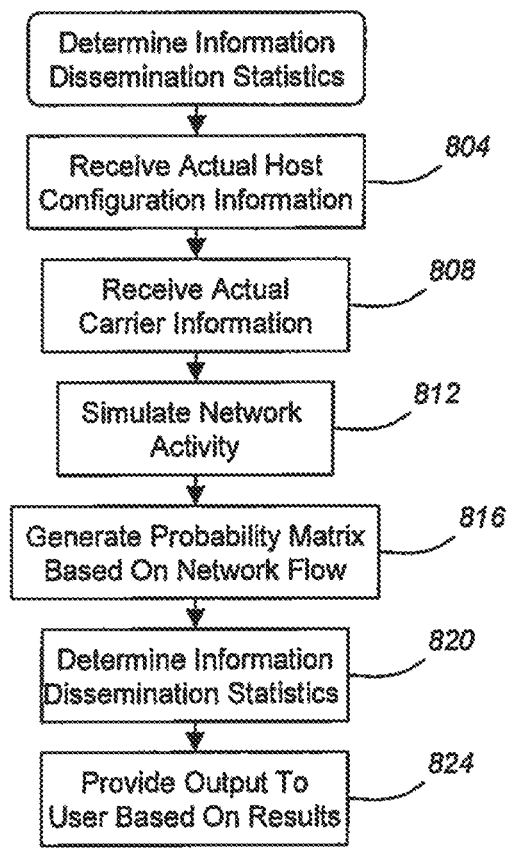
FIG. 8 is a flow chart depicting a method of determining information dissemination information in accordance with embodiments of the present invention.

With reference now to FIG. 8, a method of determining information (e.g., message object) dissemination statistics will be described in accordance with at least some embodiments of the present invention. The method begins when actual host configuration information 612 and actual carrier information 616 is received at the network analysis tool 604 (steps 804 and 808). The actual host configuration information 612 may be retrieved directly from a server or similar type of computing platform that is controlling the secure access system 200. Alternatively, the configuration information 612 may be input manually by a user of the network analysis tool 604.

Thereafter, the information flows are simulated based on information received from the communication history logs 316, 516 of the message hosts 204, 208 and carriers 220 (step 812). This simulation re-creates, within a certain degree of approximation, how a message object will be distributed throughout an actual secure access system. Moreover, the historical information can be used to project future flow statistics for the same secure access system 200.

After the information flow activity has been simulated, the network analysis tool 604 continues by generating the probability matrix showing the probability statistics for the information flow (step 816). The probability matrix may then be used to determine information dissemination statistics (step 820). The type of information dissemination statistics may include statistics related to how quickly a message object will be shared with the entire secure access system 200, how quickly a message object will be shared with a certain portion of the secure access system 200, what is the probability that a message object will be provided to a particular access control device within a predetermined time, what is the probability that a message object will not be shared with a particular access control device within a predetermined time, an indication of time needed for a message object to reach a particular access control device within a predetermined probability, and so on.

The network analysis tool 604 may then generate outputs 628 providing the determined information dissemination statistics to a user (step 824). The user may be allowed to interact with a user interface to change how the information is displayed as well as what information is displayed to the user. For example, the user may be allowed to select a particular message host on the user interface, and all of the probabilities associated with that message host (e.g., probability that it will receive a message object before a predetermined time, probability that it will not receive a message object before a predetermined time, amount of time required for it to receive a message object within a predetermined probability, number of interactions with message carriers 220 it will need before it receives the message object, etc.) as well as any other pertinent information related to the selected message host. A similar function may be performed for a selected message carrier 220 or a population of message hosts 204, 208 and/or message carriers 220.

Figure 9:
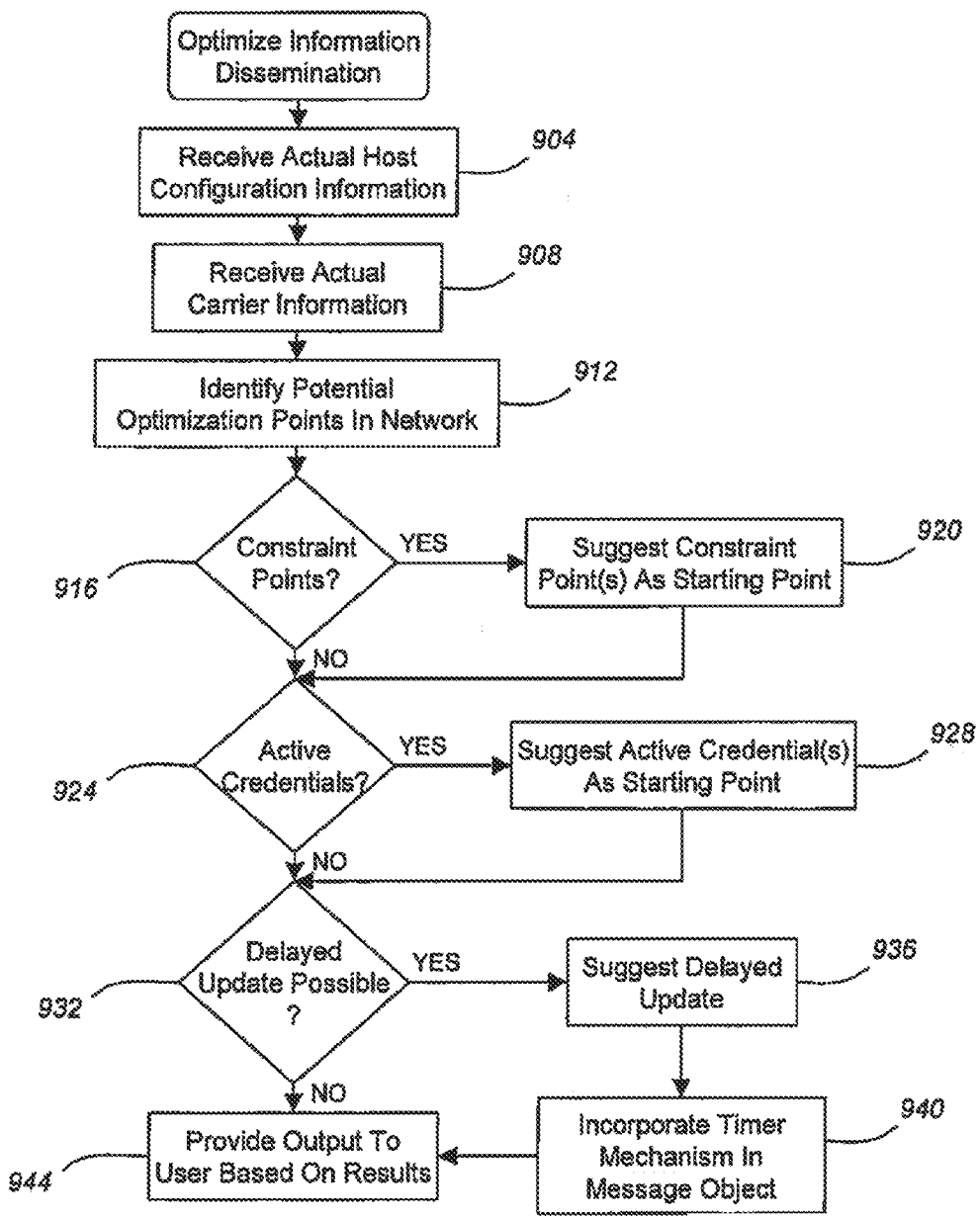
FIG. 9 is a flow chart depicting a method of optimizing information dissemination in a fixed network configuration in accordance with embodiments of the present invention.

Referring now to FIG. 9, a method of optimizing the dissemination of information (e.g., message objects) through a secure access system 200 will be described in accordance with at least some embodiments of the present invention. The method is initiated when actual host 204, 208 and carrier 220 information is received at the network analysis tool 604 (steps 904 and 908). The network analysis tool 604 may then employ the optimization agent 608 to analyze the configuration of the secure access system 200 to determine if there are any ways to enhance the efficiency with which a message object is distributed throughout the system 200 (step 912). The optimization agent 608 may analyze past simulations as well as actual distributions of message objects for the secure access system 200 or access systems having similar configurations to the secure access system 200 under scrutiny.

During its analysis of the system 200 configuration the network analysis tool 604 will utilize the optimization agent 608 to determine if there are any possible constraint points in the system 200 (step 916). Constraint points typically correspond to points in the premises 100 where a large proportion of message carriers 220 will have to pass. Typical constraint points are entry/exit doors for the building, main entrances, lobbies, restrooms, etc. If there is at least one possible constraint point identified, then the optimization agent 608 will suggest one or more of the identified constraint points as a point where a message object should be originated (step 920). More specifically, the optimization agent 608 will identify access control devices (e.g., a message host 204, 208) associated with the identified constraint point and suggest that the identified message host be used as an originating access control device. Additionally, if the message host corresponds to a non-networked message host 208, then the optimization agent 608 may also suggest that the networking capabilities of the host 208 be changed such that it becomes a networked message host 204. This would make the introduction of the message object to the system 200 easier since a system administrator would then be able to provide the message object to the host 204 remotely rather than having to carry the message object to the message host 208 on a message carrier 220.

The optimization agent 608 may also analyze the system 200 configuration to determine if there are any message carriers 220, such as credentials 112, which are typically more active than other message carriers 220 (step 924). For example, there may be certain users who have to visit a larger portion of a premises 100 than other users. As one example, often times maintenance personnel are required to visit an entire premises 100 on a daily basis whereas other types of personnel only visit certain parts of a premises regularly. The message carrier 220 associated with such active users may provide a good originating message carrier 220. These active message carriers 220 may be identified by analyzing and comparing the communication history logs 316 of the message hosts 204, 208 to search for message carriers 220 that communicated with a large number of the message hosts 204, 208.

In the event that an active message carrier 220 or a number of active message carriers 220 are identified, then the optimization agent 608 may suggest that one or more of the identified active message carriers 220 be used as an origination point for the message object (step 928). Such message carriers 220 may then be given a forced update to initiate the dissemination of the message object throughout the system 200.

The optimization agent 608 may further analyze the system 200 to determine if a delayed update would be possible, and if so, whether such an update is allowable based on preferences of the system administrator (step 932). If a delayed update is possible, then the optimization agent 608 may suggest that a delayed update be performed (step 936). To accomplish this, the optimization agent 608 may provide a suggestion that rather than having the message object be distributed in an active fashion, the message object should be distributed with a timer mechanism, which will delay the activation of the message object (step 940). The optimization agent 608 may also analyze previous information dissemination statistics for the system 200 to determine the value for the timer mechanism. More specifically, the optimization agent 608 may set the value of the timer mechanism equal to the average amount of time that is required for a message object to be shared with a predetermined percentage of the access control devices in the system. For example, the value of the timer mechanism may be set equal to 2 days if it historically takes two days for 99% of the access control devices to receive a message object.

After the various suggestions have been generated by the optimization agent 608, they are provided to the user of the system 200 (step 944). The suggested optimizations may be implemented at the discretion of the system administrator depending upon the nature and importance of the message object and the amount of security required for the secure access system 200.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

Figure 12:
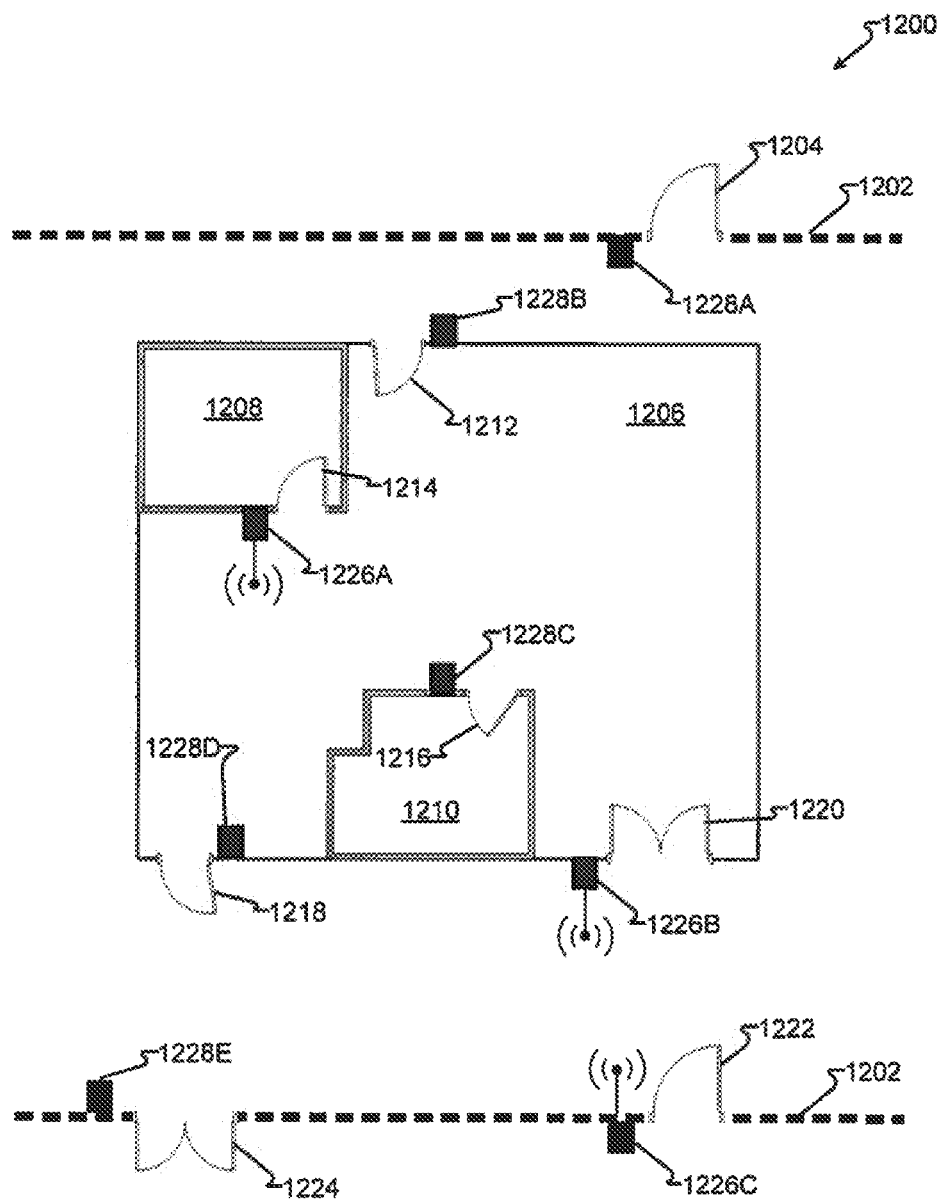
FIG. 12 depicts a secured premises in accordance with embodiments of the present invention.

Referring now to FIG. 12, secure premises 1200 will be described in accordance with at least some embodiments of the present invention. In one embodiment, secure premises includes a number of access controllers, including doors 1212, 1214, 1216, 1218, and 1220 and gates 1204, 1222, and 1224. Access controllers incorporate or are in secure communication with a host. The host receives and optionally transmits information to a credential located proximate to the host. In one embodiment, secure premises 1200 includes networked hosts 1226A-1226C and non-networked hosts 1228A-1228E.

Room 1208 illustrates a room controlled by door 1214, which in turn is controlled by networked host 1226A. In one embodiment, the number of users of room 1208 is relatively large and/or dynamic. In another embodiment, access to room 1208 requires frequent policy updates to networked host 1226A. And in yet another embodiment, networked host 1226A is situation such that networking networked host 1226A is economical. Other reasons exist as to why a particular installation may select a networked host 1226 or a non-networked host 1228.

In contrast to room 1208, room 1210 is controlled by door 1216 and, in turn, non-networked host 1228C. Room 1210 may represent a room with relatively infrequent access, stable list of authorized parties, less sensitive assets, a non-networked location, or other reasons why non-networked host 1228C is selected.

Fence 1202, also includes gates 1222, 1224, controlled by networked host 1226C and non-networked host 1228E, respectively.

Networked hosts 1226 are operable to communicate with a central server, each other, or other source of updates. As a result, networked hosts 1226 may be updated in a manner similar to many other networked components. Networked hosts 1226 may be networked via a wired and/or wireless network as is known in the art.

Non-networked hosts 1228 are not nodes on a network operable to provide updates and are therefore unable to be updated in the same manner networked hosts 122 are updated. Generally, non-networked hosts 1228 require a more direct interaction between a credential providing an update and each non-networked host 1228. In one embodiment, the interaction with non-networked hosts 1228 requires physical connectivity such as to connect to a port or provide a media file (e.g., CD-ROM, floppy disk). In another embodiment, the interaction does not require physical contact, such as a communication threshold whereby radio frequency, optical, sound, or other signal may be sent by a credential and received by non-networked host 1228 to receive the update. Although a powerful transmitter may be employed to reach a particular non-networked host 1228 anywhere on Earth, non-network hosts 1228 often require a handshake operation to authenticate the non-networked host 1228 with the source of the update and vice versa. Non-networked hosts 1228 generally have a limited power supply or other limitation that limit the distance a usable signal may be received from non-networked host 1228. Therefore, even a powerful transmitter operable to provide an update to non-networked host 1228 will generally require a receiver portion being in close proximity to the particular non-network host 1228 being updated.

Non-networked hosts 1228 are generally used in environments where networking is not possible or at least impractical. Replacing non-networked hosts 1228 with networked hosts 1226 may represent a significant investment of time, money, materials, and support. As one example, secure premises 1200 may have fence 1202, which may be a significant distance from building 1206. As a result, non-networked hosts 1228A may be capable of being networked but a wireless network operable to reach non-networked host 1228A may require a number of repeaters and a wired network may require a significant length of cabling and perhaps even repeaters for the cable. If gate 1204 is only occasionally used, networking non-network host 1228A may be impractical.

However, updates may still need to be applied to non-networked host 1228A. Similarly, secure premises 1200 includes other non-networked hosts 1228B, 1228C, 1228D, and 1228E, which may also require periodic updates.

One means of providing an update to non-network hosts 1228 is for an agent to obtain the update and visit each non-networked host 1228 in a manner determined by the agent. While such a means may be justified in certain installments or for particular updates, other means are described with respect to the embodiments herein.

Figure 13:
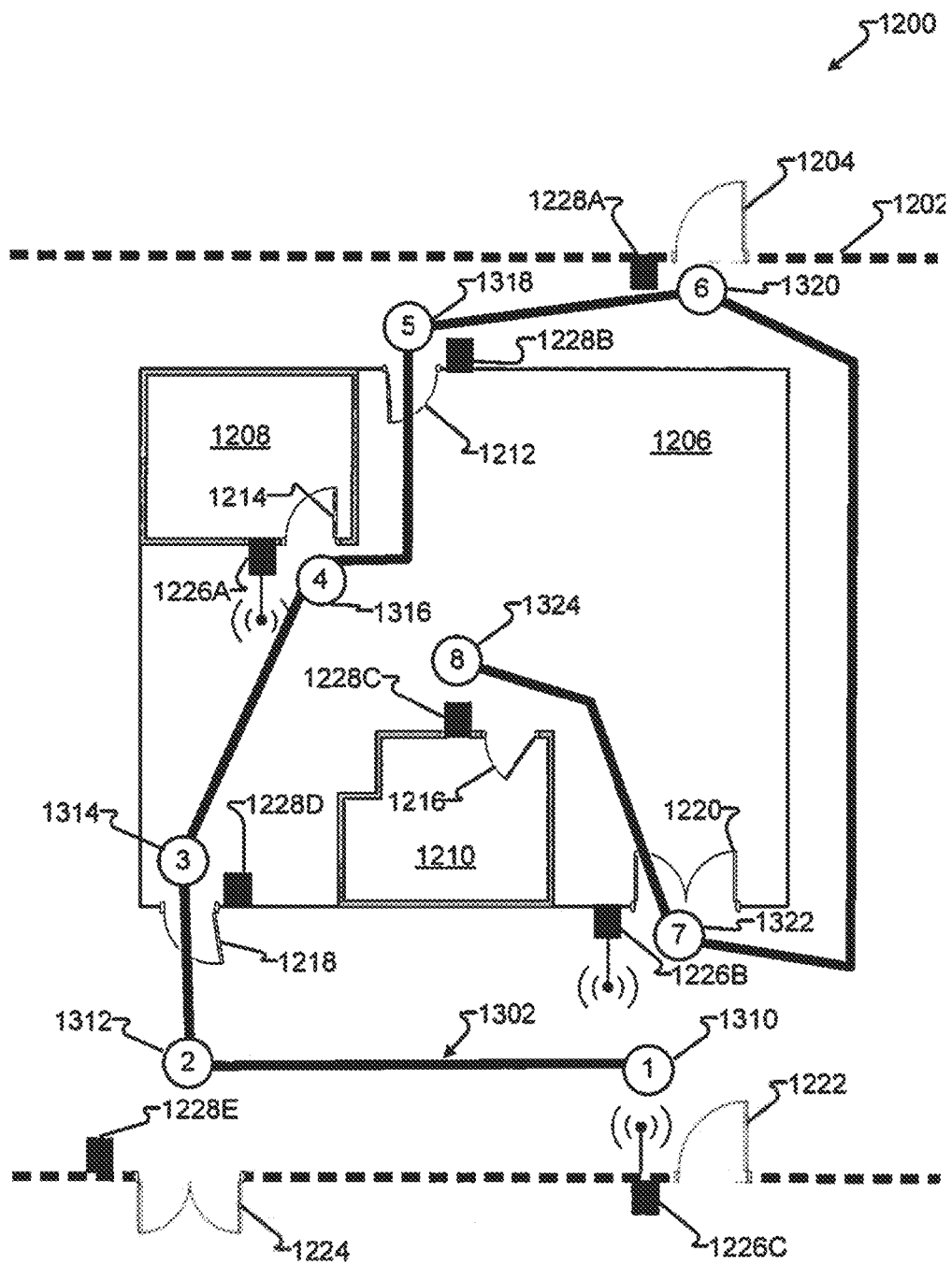
FIG. 13 depicts the secure premises of FIG. 12 and an agent route in accordance with embodiments of the present invention.

Referring now to FIG. 13, secure premises 1200 will be described in accordance with at least some embodiments of the present invention. In one embodiment, agent path 1302 is determined by a means other than for the purpose of updating non-networked hosts 1228. The agent path is followed by an agent, which may be human or non-human (e.g., delivery robot). In many implementations, the agent is a guard and agent path 1302 is a guard tour. Alternatively, the agent may be an administrator, whereby agent path 1302 is an administrator tour. The agent carries a credential operable to perform a task (e.g., gain entry to an area) and update non-networked hosts 1228.

Agent path 1302 identifies nodes 1310, 1312, 1314, 1316, 1318, 1320, 1322, and 1324 and may further indicate the order in which the agent should visit nodes 1310, 1312, 1314, 1316, 1318, 1320, 1322, and 1324, thereby forming agent path 1302. Agent path 1302 may be a foot path, vehicle path, or a combination thereof. The agent may be assigned a specific task to perform at particular node or nodes (e.g., perform a maintenance activity) or a general task (e.g., confirm doors are secure, look for unusual activity, etc.).

In one embodiment, as illustrated, nodes 1310, 1312, 1314, 1316, 1318, 1320, 1322, and 1324 are associated with access controllers 1222, 1224, 1218, 1214, 1212, 1204, 1220, and 1216, respectively. And, in turn, access controllers 1222, 1224, 1218, 1214, 1212, 1204, 1220, and 1216 are associated with hosts, specifically, networked hosts 1226C, non-networked hosts 1228E, non-networked hosts 1228D, networked hosts 1226A, non-networked host 1228B, non-networked host 1228A, networked host 1226B, and non-networked hosts 1228C, respectively.

For convenience, a host, such as networked host 1226C, issue control commands to access controllers, such as door 1222, and access controllers perform an action to grant (e.g., unlock or open) or prevent (e.g., lock or close) access to an area. This is in response to the host determining, at least in part, if a credential presented is associated with the authority to perform the act restricted by the access controller. In other embodiments, a host may be associated with an access controller that, in turn, allows or denies the operation of a machine, disable a device (e.g., an alarm), a particular function of a machine, removal of an asset from an area, or other operation whereby an asset may be protected from unauthorized activity.

In another embodiment, a particular host may not be associated with any asset. As one example, access controller 1204 is a gate in fence 1202 that is closed and permanently disabled. As a result, non-networked host 1228A is not capable of causing access controller 1204 to operate and therefore the effect is the same as denying all access requests. However, removal of node 6 (1320) from agent path 1302 may result in an agent, such as a guard, "cutting corners" and going from node 5 (1318), back inside and through building 1206, to node 7 (1322). However, by including node 6 (1320) whereby the guard scans his or her credential at non-networked hosts 1228A, the guard may be more likely to follow the assigned agent path 1302, such as by walking around the exterior of the building, even if the only operational feature of non-networked hosts 1228A is to indicate a particular credential was presented.

In one embodiment, an agent following agent path 1302 may be able to utilize the credential presented at networked hosts 1226 and non-networked hosts 1228 for obtaining and disseminating information. In a further embodiment, an administrator of secure premises 1200 may which to deliver a message to an agent currently along agent path 1302. The administrator may send such a message to networked hosts 1226, whereby upon the agent presenting his credential at one of networked hosts 1226, the message is delivered to the credential, and presented to the agent. One message, that may be delivered in such a manner is a modification to agent path 1302. Another message may be an update for one or more non-networked hosts 1228. In yet another embodiment, an update for one or more non-networked hosts 1228 may be provided to the credential from source other than networked host 1226.

With agent path 1302 determined, it can be known, or at least estimated, when an update will be delivered to one or more non-networked hosts 1228. In one example, a guard starts at node 1 (1310) and scans his or her credential at networked host 1226C, thereby obtaining an update. If an update to non-network host 1228A is required within three hours and the estimated time the guard takes to reach node 6 (1320) and present his or her credential to non-networked host 1228A, thereby providing the update, is two hours, then no further action is needed. However, an analysis of the route, such as by implementing the embodiments above, may indicate that a particular node will not be visited, or at least visited in time, to provide the update. This may be particularly true if the credential is only able to provide a portion of the update during any one visit, such as due to memory limitations of the credential.

In another embodiment, determining that a particular non-networked host will not receive an update by a deadline by an agent following agent path 1302, occurs when a non-network host is not on agent path 1302 and therefore never visited. As one example, networked host 1226C is associated with gate 1222 in fence 1202. Gate 1222 may be a gate intended for human foot traffic. In close proximity to gate 1222 is a vehicle gate, such as gate 1224 with associated non-networked host 1228E. A guard at node 1 (1310), as evidenced by scanning their credential at networked host 1226C, may be able to perform all of their duties associated with gate 1224 at the same time. As a result, node 2 (1312) is only included in agent path 1302 when an update to non-networked host 1228E is required.

In one embodiment, agent path 1302 is modified such that a non-networked host (e.g., non-networked hosts 1228A) that would not receive an update by a deadline, will receive the update by the deadline by an agent following a modification to agent path 1302. The modified agent path may be presented to an administrative user, such as to facilitate further analysis or modifying agent path 1302 prior to the agent starting agent path 1302. The modified agent path may be provided directly to the agent, such as via the credential being presented at networked host 1226, utilizing a cellular telephone network, and/or other radio communication.

Figure 14:
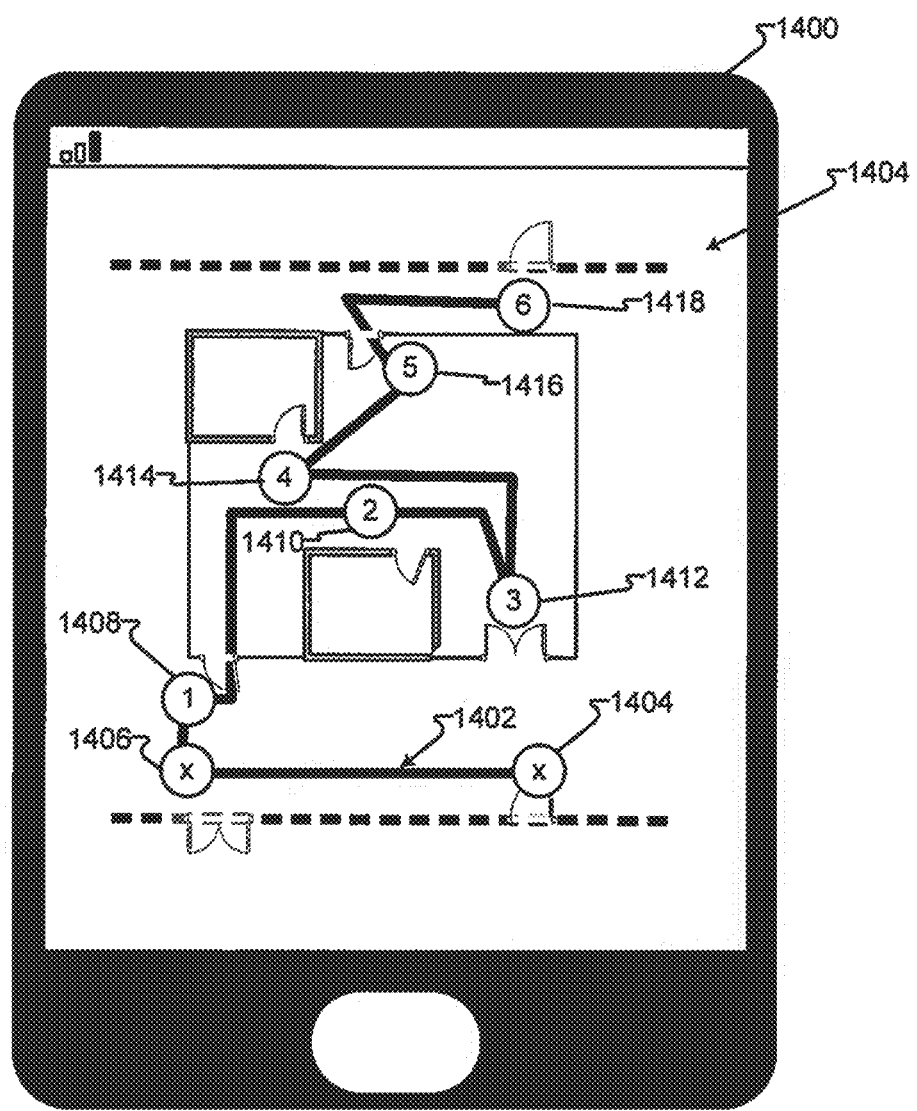
FIG. 14 depicts a credential displaying the secure premises of FIG. 12 and a modified agent route.

FIG. 14 depicts credential 1400 displaying a representation of secure premises 1404 and modified agent path 1402 in accordance with embodiments of the present invention.

Credential 1400 is variously embodied and may include a radio frequency (RF) proximity card, RF smart card, magstripe card, optically based access credential, biometric authentication credential, key fob, CD-ROM, flash drive, smart phone, smart watch, personal data assistant (PDA), tablet computer, and laptop computer. Credential 1400 may utilize the features of another component to provide certain operations. For example, when credential 1400 is embodied as a magstripe card, the agent may carry another device operable to swipe the magstripe card and display relevant information to the agent. In another embodiment, a device operable to receive one form of communication (e.g., cellular telephone) may be used to receive information for delivery to the credential. For example, a smart watch may present messages in text, audio, graphical, or video format received from another device, such as a smart phone.

As described with respect to the previous embodiments, agent path 1302 may need to be modified. Once modified, the modified agent path is made available to a user. The user may be an administrator performing another action. For example, it may be determined that in order for a particular non-networked host to receive a timely update, the modified agent path omits a sensitive area. In such an example, the administrator may then request an additional guard tour to address the vulnerability of the omitted area or take other action as appropriate.

In another embodiment, an agent carrying credential 1400 may be engaged in their duties and currently at some point on agent path 1302. An update is determined required by one or more non-networked hosts 1228. In one embodiment, the credential was notified of the update via a cellular network, long range radio signal, or other source of remote data. In another embodiment, credential 1400 was notified of the update via presentation, and the resulting data exchange, with at least one networked host 1226.

Modified agent path 1402 may then be displayed on credential 1400 or on a component operable to display modified agent path 1402. Credential 1400 displays secure premises 1404, which may be stylized, simplified, or otherwise omit information unwanted by the agent or included information wanted by the agent. In one embodiment, the agent does not need to visit node 1404 and 1406, such may be an indication that the agent has completed their visit to nodes 1404 and 1406. In another embodiment, modified agent path 1402 omits nodes 1404 and 1406.

In one embodiment, the agent with credential 1400 received modified agent path 1402, which first instructs the agent to visit node 1 (1408), which was previously been known as node 3 (1314) of agent path 1302. From there the agent is instructed to visit node 2 (1410), node 3 (1412), node 4 (1414), node 5 (1416), and node 6 (1418), in that order. Such a modified agent path 1404 may have been developed due to a pressing need to update node 2 (1410) with an update received at previous visited node, such as node 1404.

Although any networked hosts may be provided with the update, which may further comprise modified agent path 1404 or an update to be delivered to one or more non-networked hosts 1228. Certain advantages may be realized by determining where the agent is along agent path 1302 and making the update available to a next visited networked host 1226. In one embodiment, a global positioning satellite (GPS) signal is received by the agent, which in turn may be a component of credential 1400, and delivered to a processor via a communication means, such as two-way radio, cellular network, or networked host 1226. Secure premises 1200 may also include motion detectors, pressure mats, cameras or other means by which the position of an agent may be determined.

Once an agent's location is determined, a next networked host 1226 may be selected to receive the update. In one embodiment, an agent may obtain an update from one networked host 1226 and, by scanning his or her credential, delivered the update to one non-networked host 1228. A user may have been denied access by the one non-networked host 1228 and called a security desk. The security desk determines the agent's position and sends an update to the next visited networked host 1226. The update also includes a modified agent path 1402 to take the agent back to the non-networked host 1228 and deliver the update. In such a manner, routine and ad hoc updates may be provided by an agent, even if the agent has already begun their rounds on an agent path.

In another embodiment, a central server receives feedback that a node was visited. The feedback may be accomplished by the credential delivering the status (e.g., timestamp, reader number, etc) of a visited non-networked host. In another embodiment, credential 1400 may also transmit feedback information via a wired or wireless networked, which such a network is available to credential 1400. Additional status information, such as for audit trails may be collected and stored on the central server, credential 1400, and/or another device. Status information may be sent via a networked hosts 1226 or other network connection (e.g., cellular network, wired, wireless, infrared, etc.). Another additional status may be operational information such as when an agent is off course or taking too long or when a fault in credential 1400 or related device is detected, such as a weak battery or excessive number of attempts to perform an action.

Figure 15:
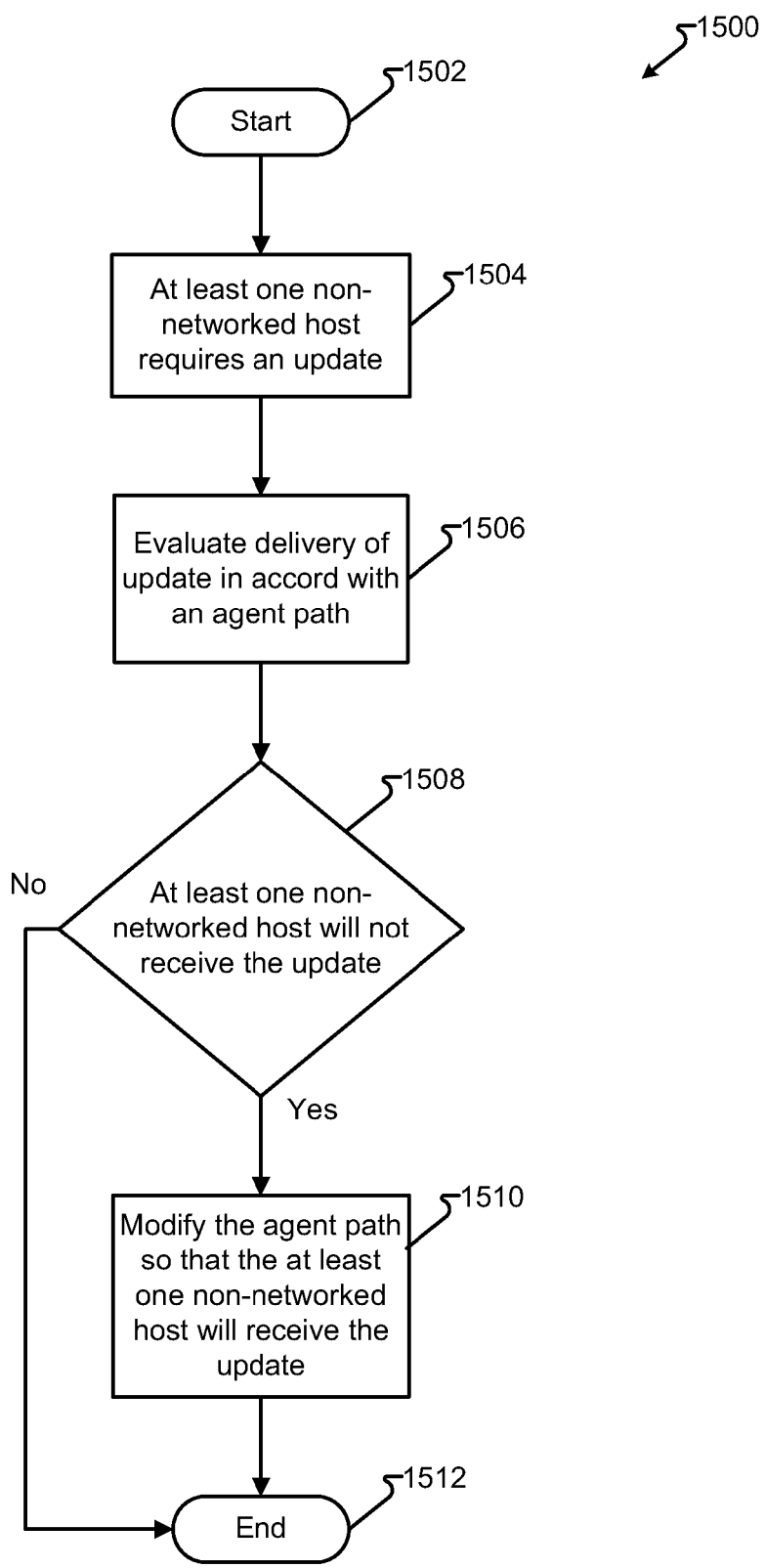
FIG. 15 is a flow chart depicting a method of obtaining a modified agent route.

FIG. 15 is flow chart 1500 depicting a method of obtaining a modified agent route in accordance with embodiments of the present invention. Step 1502 starts the method. Step 1502 may include receiving notification from another process that an update is available. Step 1504 determines at least one non-networked host, such as non-networked host 1228A, requires an update. Step 1506 evaluates the delivery of the update to the non-networked host 1228 in accord with an agent path, such as agent path 1302. Step 1508 determines if at least one non-networked host will not receive the update by the agent following the agent path. If step one is no, processing may end 1512 and, as a result, the non-networked host may then receive an update in the normal course of an agent following the agent path. However, if step 1508 determines that at least one non-networked host will not receive an update, or not receive the update in a timely manner, then processing continues to step 1510, whereby a modified agent path, such as modified agent path 1402, is created. From their process ends 1512.

Once a modified agent path has been developed, it may be provided to a user for evaluation or to an agent for execution.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

Figure 16A:
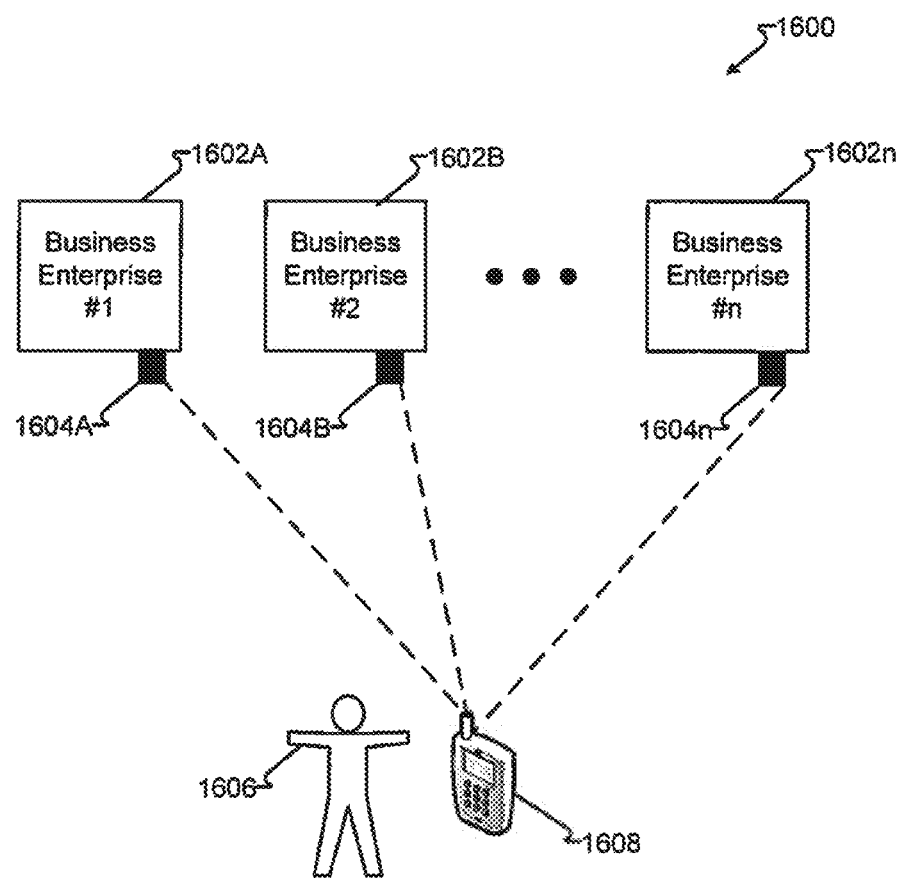
FIGS. 16A-16B illustrate a system using a portable device for storing reads in accordance with embodiments of the present invention.
Figure 16B:
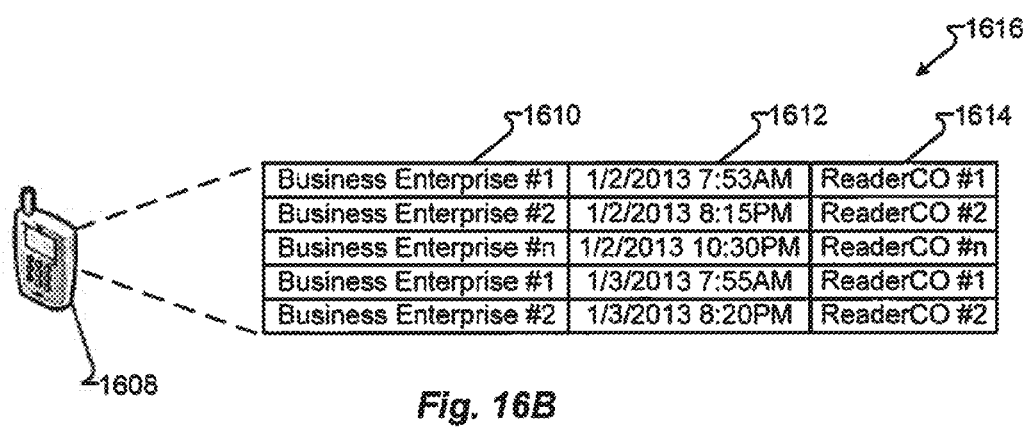

FIGS. 16A-16B illustrate system 1600 using a portable device for storing reads in accordance with embodiments of the present invention. In one embodiment, user 1606 has device 1608. Device 1608 may be a dedicated access device, such as magnetic strip card, radio frequency card, and the like. In other embodiments, device 1608 may be the personal property of user 1606 or a party, such as a parent or employer, of user 1606 and be embodied in a specific device or a more general device, such as a cell phone, smart phone, or similar device with access requesting functionality installed therein. Device 1608 may represent a Bring Your Own Device ("BYOD") access request whereby the operator of Business Enterprises 1602 operating readers 1604 do not have to provide credentialing hardware and/or software directly to user 1606. Instead, user 1606, or another party operating for the benefit of user 1606, may acquire access credentials, software, firmware, and/or supporting hardware from another source, including but not limited to, the Internet, cell phone retailers, and/or application providers.

In a further embodiment, readers 1604 may be queried multiple times, such as to determine if more than one protocol (e.g., exchange protocol, broadcast frequency, receive frequency) may be utilized by a particular one of readers 1604.

User 1606, with device 1608, may then present device 1608 to readers 1604 to gain access to business enterprises 1602. It should be noted that and one or more of business enterprises 1602 may be a distinct business enterprise, as illustrated, a component of a single business enterprise, and/or any controlled access for which readers 1604A-1604n may determine authorization of device 1608 alone or with additional information (e.g., biometric information, personal identification code or number, password, or other challenge-response). Such a challenge-response may be provided by and to readers 1604 and/or an interface on device 1608.

In another embodiment, device 1608 stores records 1616 of encounters with readers 1604. For example, in FIG. 16B, reader 1608 has a record stored therein of prior reads from ones of readers 1604. In a further embodiment, the record has fields for enterprise 1610, date and time 1612, and reader manufacturer 1614. Additional fields may include, GPS or other geo-location information, other radio frequency signals and/or names (e.g., WiFi Mac addresses, WiMax, Bluetooth, Zigbee, etc.), non-radio frequency signals (e.g., infrared-based network interfaces), success/failure to read and/or be authenticated, model number of reader, firmware version of reader, and/or other information provided by readers 1604 or are detectable by device 1608 at the time of a particular read event. However, such information may be acquired without being associated with the presenting of device 1608 to one of readers 1604. For example, device 1608 may be operable to record network or other signals as user 1606 performs other activities, such as walking, driving, and the like.

In a further embodiment, a reader, such as reader 1604B, may be operable to read records 1616 and perform analysis on records 1616. In a still further embodiment, records 1616 may be stored in a removable memory (e.g., SIM card) for reading by a reader of such removable memory.

Figure 17:
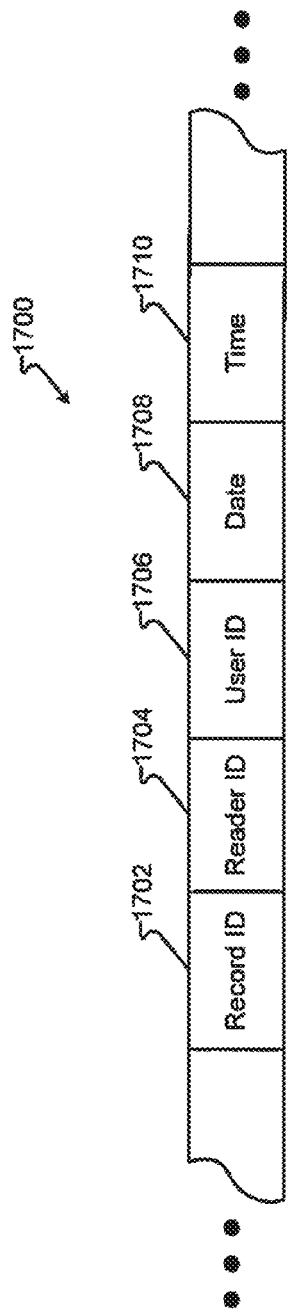
FIG. 17 illustrates data record in accordance with embodiments of the present invention.

FIG. 17 illustrates data record 1700 in accordance with embodiments of the present invention. As a credential device, such as device 1608 and/or dedicated credential devices, are utilized certain patterns may be detected. Record 1700 records a number of activities associated with the presentation of credentials at a reader. In one embodiment, record identifier 1702 provides a unique identifier of the individual record, reader identifier 1704 identifies the reader such as by name, number, location, latitude-longitude, and so on. User identifier 1706 provides indicia of the user of the credential device, date 1708 and time 1710 provide the date and time associated with record 1700. Other fields in record 1700 may be added or omitted based on a particular need and/or system requirements.

In other embodiments, certain fields of associated with record 1700 may be stored on the credential device, another device, or computed by the other device and/or the credential device. For example, date 1708 may be supplemented with another field (not shown) indicating day of the week, day of the month, holiday, and/or other features.

In a further embodiment, patters associated with a number of records 1700 may be analyzed such that discrepancies from that pattern may be identified and, if warranted, additional measures taken.

In one embodiment, user 1606 with device 1608 has caused a number of records 1700 to be created. A system, which may include device 1608 and/or another device, may analyze those records. Attempting to access a resource for which user 1606 should known they are not authorized may, in and of itself, warrant additional measures to be taken, however, user 1606 may have access to certain resources but performs such access in a new and/or unusual manner. While such atypical behavior may be innocent, expected in light of new circumstances, or even random, it may be brought to the attention of personnel and/or systems to verify that user 1606 is not performing improperly. Alternatively, if such behavior is improper, it may be beneficial to catch user 1606 "red handed" or to implement additional security and/or surveillance techniques.

In another embodiment, the patch device 1608 took may indicate an atypical behavior. The path may be determined by GPS, visual, network, or other positioning technology and/or by the order, or presence of any intervening presentations of device 1608. In yet another embodiment, device 1608 is accompanied by at least one other credential, which may or may not be presented for authentication. This other credential may indicate a borrowed or stolen credential. For example, user 1606 may borrow the other credential from a co-worker and demonstrate the pattern of usage of user 1606 and not the co-worker. However, a pattern of usage that is different may indicate an unauthorized use.

EXAMPLE 1

User 1606 has always used "door 1" and the associated reader identifier 1704 associated with "door 1." If user 1606 uses "door 2," an atypical situation may exist. If, for example a number of users have the same behavior and, like user 1606 begin to use "door 2," then a condition may exist that indicates a defect in "door 1" or some other factor related to "door 1" being inaccessible or inoperable. However, in particular environments, the use of "door 2" may indicate a suspicious behavior and require additional measures.

EXAMPLE 2

User 1606 has predictable days of work and date field 1708 and/or time field 1710 shows user 1606 interacting with reader identifier 1704 in a manner that varies insignificantly. Perhaps user 1606 enters a building between 7:50 AM, plus or minus a few minutes, Monday through Friday and on the first Saturday of the month when he/she enters at 10:00 AM, plus or minus a few minutes, and leaves at 11:00 AM, plus or minus a few minutes. If user 1606 presents their credentials at a reader at 7:58 AM on a Thursday, such behavior is well within the pattern established by user 1606 and no action taken.

However, if user 1606 presents their credentials at a reader at a time and/or date outside of that past behavior, such as 5:30 AM on a Monday or anytime on a Sunday, such a behavior may be identified as unusual and warrant additional action.

EXAMPLE 3

User 1606 presents their credentials close to the beginning of their work shift. User 1606 then has a few days in a row where they present their credentials several times within a short span of time. While such a behavior may occasionally be noted of user 1606 or any number of other users, such as when they forget an item in their car, a certain number of such acts may be more indicative of pilferage and warrant further action.

EXAMPLE 4

User 1606 has attributes associated with a number of other users (e.g., similar department, title, responsibilities, and/or pattern determined from a number of other records 1700 for user 1606 and the number of other users). If user 1606 then takes an action out of the ordinary for the group of users, such action may warrant additional action. As a further example, all employees in "Department A" access the office by "Door #1," except for user 1606 who uses "Door #2." Such an action may be benign and simply indicate a preference of "Door #2" over "Door #1." However, based on a particular implementation, such an action may be associated with activity outside of work responsibilities and warrant further action.

The identification of atypical behavior is variously embodied. Certain acts may be anomalous with only one attempt, such as user 1606 attempting to access a resource clearly identifying such a resource as off limits to user 1606. However, other behavior is more subtle. In one embodiment, times of day, days of the week, days of the month, or other units of dates and/or times are associated with a probability, such a standard deviation. While any behavior may vary slightly, such as one standard deviation, during normal operations, unusual events may cause the range to be tunable. For example, a flood or other unusual event may cause two or more standard deviations to be considered normal behavior. Certain acts that occur during a holidays or other events that cause site-wide closings or portions of the site being closed may also be an atypical behavior. User 1606, may have a 98% probability of attempting access to a resource between 7:50 and 8:10 on a Monday and a 25% probability of accessing the resource on a Saturday. Further analysis may show that the Saturday access is much higher when associated with the first Saturday of the month and zero when associated with a Saturday that is not the first Saturday of the month. Similarly, accessing at 9:30 PM has, based on the prior pattern of behavior, be zero. Other pattern/anomaly recognition techniques are also contemplated herein.

Once a threshold is determined, a violation of that threshold may cause additional action to be taken. The additional action may include, denying access, requiring a second authorized party to be present, notifying security, notifying non-security personnel (e.g., manager, human resources, etc.), triggering an alarm, and/or other actions. The actions may also be sequenced. For example, a user attempting to gain access to their office outside of their normal work shift may initially be denied access but have the denial be overridden by another action (e.g., approval of another party, secondary authentication, etc.). The secondary authentication may be an instruction for a user to call a number, rescanning their credential, pushing a button, or other action as may be necessitated by a site.

The operational status of the site may also be tunable. For example, during normal events an atypical behavior may cause one action (e.g., making a record and taking no further action unless a second atypical behavior is detected within a certain time period, requiring the user to perform a low-level secondary authentication like entering a secondary credential such as a password or employee number, and so on). However, if the site has an increased threat-level the same atypical behavior may result in a higher level response (e.g., requesting a secondary authentication from security personnel, denying access, etc.).

The determination of an atypical behavior may be determined by a reader, a credential, a computer with at least occasional access to the reader and or the card, or a combination thereof.

Figure 18:
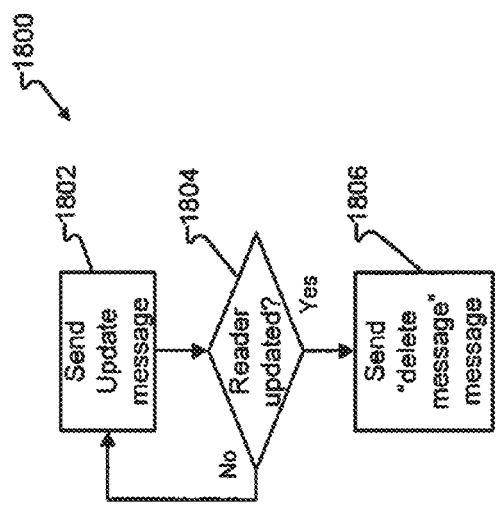
FIG. 18 illustrates a reader update message and a follow-up delete message in accordance with embodiments of the present invention.

FIG. 18 illustrates flowchart 1800 for updating a reader. Step 1802 sends an update message to a number of readers. Step 1804 determines if the reader is updated if no, other processing (not shown) may be implemented or processing returns to step 1802 to resend the update message. If step 1804 determines the update message was successful, step 1806 sends a delete message such that the update message send in step 1802 may be removed from the reader.

In another embodiment, step 1804 determines if all readers in a system have been updated and, if so, step 1806 is send to all readers to delete the update message sent in step 1802.

In a further embodiment, step 1806 also causes the reader to delete the message sent in 1806 thereby causes the reader to delete the message sent in step 1802 and the delete message sent in step 1806.

FIG. 19 illustrates item 1902 with trusted tag 1904 in accordance with embodiments of the present invention. Trusted tag 1904 and assumedly, item 1902 to which it is attached, is inserted into a course of motion. The course of motion may or may not be known at the time of the time the course of motion begins.

Trusted tag 1904 then makes a record, such as record 1616, of the environment encountered during the course of motion. The records may include time, date, reader, network name/identifier, wavelengths, GPS, or other observable factors. If trusted tag 1904 is implemented as an access credential then records may include reader manufacture, protocol, success/failure, and the like.

Trusted tag 1904 may "call home" upon accessing an available network or interface to a network. Trusted tag 1904 may contain a battery, solar cell, inductive ring, or other technology to store, generate, and/or utilize power sources provided directly or indirectly to smart tag 1904. In another embodiment, trusted tag 1904 is associated with item 1902 which is returned to the sender or a counterpart to the sender. In such embodiments, the data contained in trusted tag 1904 may be accessed and read.

The systems, methods and protocols of this invention can be implemented on a special purpose computer in addition to or in place of the described access control equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various data messaging methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for optimizing data messaging in a secure access system having at least one non-networked reader. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
creating a number of records each associated with a presentation of a credential device to a reader for authentication, wherein the reader, at least in part, controls access to the interior of a secure premises and wherein, in response to the presentation of the credential device to the reader by a user, access to the interior of the secure premises was granted to the user;
analyzing, by a processor, at least two of the number of records to determine a predicted behavior from the analyzed number of records; and
setting an indicator upon the analysis further determining that at least one of the number of records indicates a behavior atypical of the determined predicted behavior.

2. The method of claim 1, further comprising, in response to the indicator being set, performing at least one of requiring a secondary authentication, denying access to the interior of the secure premises, indicating the user associated with the credential device may warrant additional scrutiny, placing an indicia of the atypical behavior on the credential device, alerting other personnel, and triggering an alarm.

3. The method of claim 1, wherein the analysis further comprises determining that the at least one of the number of records indicates the behavior atypical of the determined predicted behavior excluding an acceptable amount of deviation.

4. The method of claim 1, wherein, the number of records is further associated with a plurality of credential devices.

5. The method of claim 1, wherein the atypical behavior is associated with a different reader controlling access to the interior of the secure premises.

6. The method of claim 1, wherein the atypical behavior is determined by a deviation from the predicted behavior comprising at least one of a time of day, day of the week, day of the month, day of the year, and operational status of a site comprising the reader.

7. The method of claim 1, wherein the atypical behavior is determined by at least a first portion of the number of records that were created within a unit of time deviating from a second portion of the number of records, associated with the predicted behavior, that were created during the unit of time.

8. The method of claim 1, wherein the atypical behavior is determined by the location of a second reader different from the reader.

9. The method of claim 1, wherein the predicted behavior is determined by analysis of a number of the records associated with a plurality individuals having a similar predicted behavior.

10. A system, comprising:
a reader, at least in part, controlling access to the interior of a secure premises, and operable to read a credential device;
a storage medium; and
a processor operable to:
create a number of records, ones of the records being associated with the presentation of the credential device to the reader and wherein, in response to the presentation of the credential device to the reader by a user, access to the interior of the secure premises was granted to the user,
store the records in the storage medium,
analyze at least two of the number of records to determine a predicted behavior from fields of the number of records, and
set an indicator upon the analysis further determining that at least one of the records deviates from the determined predicted behavior.

11. The system of claim 10, further comprising:
an indicator reader operable to read the indicator; and
a response processor operable to respond to the indicator.

12. The system of claim 11, wherein the response processor responds to the indicator by performing at least one of requiring a secondary authentication, denying access to a resource, indicating a user associated with the credential device may warrant additional scrutiny, and triggering an alarm.

13. The system of claim 10, wherein the processor determines the predicted behavior from fields of the number of records associated with at least one of time of day, day of the week, day of the month, and day of the year.

14. The system of claim 10, wherein the processor determines the predicted behavior from fields of the number of records associated with the location of the reader.

15. The system of claim 10, wherein the processor determines the predicted behavior from fields of the number of records associated with a quantity of the number of records created within a unit of time.

16. The system of claim 10, wherein the processor determines the predicted behavior from fields of the number of records associated with a plurality individuals having a similar predicted behavior.

17. A portable credential device, comprising:
   a storage medium; and
   a processor operable to:
      create a number of records, each record associated with the presentation of the credential device to the reader and wherein, in response to the presentation of the credential device to the reader by a user, access to the interior of the secure premises was granted to the user,
      store the records in the storage medium,
      analyze at least two of the number of records to determine an predicted behavior from fields of the number of records, and
      set an indicator upon the analysis further determining that at least one of the records deviates from the determined predicted behavior.

18. The portable credential device of claim 17, wherein the processor is operable to:
   upon determining the indicator is set, block the authentication such that the portable credential device is not authenticated.

19. The portable credential device of claim 18, wherein the processor is further operable to:
   require a secondary authentication, and
   make a decision to remove the block upon the secondary authentication being determined to be successful.

20. The portable credential device of claim 19, wherein the secondary authentication is a code entered by the user on at least one of the portable credential device and the reader.

* * * * *